(12) United States Patent
Bae

(10) Patent No.: US 11,668,273 B2
(45) Date of Patent: Jun. 6, 2023

(54) HYDROELECTRIC POWER GENERATION DEVICE

(71) Applicant: Myung Soon Bae, Yangju-si (KR)

(72) Inventor: Myung Soon Bae, Yangju-si (KR)

(73) Assignee: Myung Soon Bae, Yangju-si (KR)

( * ) Notice: Subject to any disclaimer, the term of this patent is extended or adjusted under 35 U.S.C. 154(b) by 262 days.

(21) Appl. No.: 17/040,288

(22) PCT Filed: Feb. 14, 2019

(86) PCT No.: PCT/KR2019/001790
§ 371 (c)(1),
(2) Date: Sep. 22, 2020

(87) PCT Pub. No.: WO2019/190051
PCT Pub. Date: Oct. 3, 2019

(65) Prior Publication Data
US 2021/0017953 A1    Jan. 21, 2021

(30) Foreign Application Priority Data

Mar. 26, 2018  (KR) .......................... 10-2018-0034787

(51) Int. Cl.
| F03B 17/06 | (2006.01) |
| F03B 13/08 | (2006.01) |
| F03B 3/12 | (2006.01) |
| F16H 9/04 | (2006.01) |

(52) U.S. Cl.
CPC .......... *F03B 17/061* (2013.01); *F03B 13/083* (2013.01); *F03B 3/121* (2013.01); *F05B 2220/32* (2013.01); *F05B 2220/706* (2013.01); *F16H 9/04* (2013.01)

(58) Field of Classification Search
CPC .. F03B 13/083; F03B 3/121; F05B 2220/706; F16H 9/04
USPC ....................................................... 290/43, 54
See application file for complete search history.

(56) References Cited

U.S. PATENT DOCUMENTS

| 4,816,697 | A | | 3/1989 | Nalbandyan et al. |
| 5,105,094 | A | * | 4/1992 | Parker ................... F03B 13/186 |
| | | | | 290/43 |
| 8,344,536 | B1 | * | 1/2013 | Gotay ..................... F03B 13/00 |
| | | | | 290/54 |
| 8,742,608 | B2 | * | 6/2014 | Micu ....................... F03D 15/00 |
| | | | | 290/43 |
| 2010/0187829 | A1 | | 7/2010 | Douglas |

(Continued)

FOREIGN PATENT DOCUMENTS

| CN | 102472114 A | 5/2012 |
| CN | 105673085 A | 6/2016 |

(Continued)

*Primary Examiner* — Charles Reid, Jr.
(74) *Attorney, Agent, or Firm* — Bridgeway IP Law Group, PLLC; Jihun Kim

(57) ABSTRACT

A hydropower generator includes: a driving shaft installed along a path through which a fluid flows; a plurality of blade assemblies installed along a lengthwise direction of the driving shaft; a spinning supporter connected to rotatably support the driving shaft; a power generator receiving a spinning force of the driving shaft and generating electricity; and a flow pipeline internally provided with the driving shaft along a lengthwise direction thereof and formed with a channel through which a fluid flows.

38 Claims, 22 Drawing Sheets

(56) References Cited

U.S. PATENT DOCUMENTS

2010/0320771 A1    12/2010   Urch
2012/0003077 A1     1/2012   Churchill

FOREIGN PATENT DOCUMENTS

| CN | 106593748 A | 4/2017 | |
|---|---|---|---|
| CN | 107407251 A | 11/2017 | |
| DE | 102008022821 A1 | 11/2009 | |
| EP | 3184806 A1 | 6/2017 | |
| KR | 10-2011-0010269 A | 2/2011 | |
| KR | 10-2011-0058998 A | 6/2011 | |
| KR | 10-1088101 B1 | 11/2011 | |
| KR | 10-1256823 B1 | 4/2013 | |
| KR | 10-1381022 B1 | 4/2014 | |
| KR | 10-1642677 B1 | 7/2016 | |
| KR | 10-1786451 B1 | 10/2017 | |
| RU | 112718 U1 | 1/2012 | |
| RU | 2563287 C2 | 9/2015 | |
| WO | 0028210 A1 | 5/2000 | |
| WO | WO-2009062261 A1 * | 5/2009 | ............ F03B 11/02 |
| WO | 2017164091 A1 | 9/2017 | |
| WO | 18102886 A1 | 6/2018 | |

\* cited by examiner

HYDROELECTRIC POWER GENERATION DEVICE

TECHNICAL FIELD

The disclosure relates to a hydropower generator, and more particularly to a hydropower generator which has a compact and simple structure, efficiently generates electric energy by arranging multistage blade assemblies along a flow path of a fluid, and not only improves power generation efficiency but also is easily installed and dramatically lowers installation costs because the arrangement position and the number of blade assemblies are properly adjustable according to flow amount, flow rate, designed capacity and local conditions.

BACKGROUND ART

In general, small hydropower generation is worthy enough as an alternative energy resource because it has a lot of potential for development in terms of applicability to an agricultural reservoir, an agricultural pool for irrigation, a sewage treatment plant, an aquafarm drain waterway, a multipurpose dam spillway, etc. as well as a small river.

Such small hydropower generation is classified according to heads, power generation types, etc., and the power generation types include a waterway type, a dam type, a tunnel type, etc.

Further, the small hydropower generation is classified into an impulse water turbine and a reaction water turbine according to power generation methods, and the kinds of impulse water turbines include a Pelton water turbine, a Turgo water turbine, an Ossberger water turbine, etc., and the kinds of reaction water turbines include a Francis water turbine and a propeller water turbine.

In addition, various researches and developments of the small hydropower generation are in progress because the small hydropower generation is convenient to be installed and used even in a mountainous area, a remote area, a remote island, and the like place difficult to get electricity, and is relatively highly profitable when the flow amount is constant.

For example, Korean patent No. 10-1256823 (registered on Apr. 16, 2013 Apr. 16) has disclosed the small hydropower device.

The conventional small hydro-power device is designed to include two propellers such as a first propeller 130 and a second propeller 140, and three guide vanes such as a first guide vane 150, a second guide vane 160 and a third guide vane 170 which are overlapped with one another in a housing 110 from an inflow direction of a fluid. Further, a generator 120 is provided outside the housing 110, and connected to a connector formed on an outer circumferential surface of one of the propellers 130 and 140, so that kinetic energy of the propellers 130 and 140 can be converted into electrical energy, thereby generating power.

Further, the housing 110 is internally provided with the first guide vane 150 at a frontside thereof, and the first guide vane 150 functions to make a fluid flowing into a first housing 111 be smoothly introduced to the first propeller 130.

Meanwhile, the first propeller 130 is placed behind the first guide vane 150, and the fluid introduced through the first guide vane 150 causes the first propeller 130 to spin so that the first propeller 130 can have kinetic energy.

The conventional small hydro-power device has an advantage of reducing a loss of flow energy in a flow field because equipment needed for power generation is installed outside the water turbine, but has many disadvantages as follows.

First, the conventional small hydro-power device has a disadvantage that output of electrical energy caused by power generation is limited because the number of propellers installable inside the housing 110 is limited to about two.

Further, the conventional small hydro-power device has a disadvantage that equipment costs are too high and increase in weight makes it difficult to install and manage the equipment because the generator 120 needs to be installed in every housing 110.

Further, the conventional small hydro-power device has a complicated structure that the guide vanes are installed in front and back of the propeller, thereby not only increasing production costs but also having difficulty in maintenance.

In particular, the conventional small hydro-power device requires a long installation period and man hour because the housings 110 are arranged one by one and then connected in case of multistage installation along a channel and the generator 120 needs to be installed in each housing, and has low construction quality because it is very difficult to construct the plurality of housings 110 while keeping a given route and installation uniformity, thereby also disadvantageously lowering a power-generation efficiency.

Besides, the conventional small hydro-power device not only has a disadvantage that it takes long time to perform repair work because the small hydro-power device needs to be fully disassembled when the propeller is out of order and idle time increases because a complicated internal structure is easily clogged and frequently breaks down when it is installed in a river or the like where a lot of foreign materials are introduced, but also is not installable in a curved channel.

PRIOR ART DOCUMENTS

Patent Documents (Patent Document 0001) Korean Patent No. 10-1256823, titled "SMALL HYDRO-POWER DEVICE"
(Patent Document 0002) Korean Patent Publication No. 10-2011-0010269, titled "DEVICE FOR SMALL GENERATION OF HYDROELECTRIC POWER"
(Patent Document 0003) Korean Patent No. 10-1088101, titled "SMALL HYDROPOWER GENERATING SYSTEM"

DISCLOSURE

Technical Problem

The disclosure has been proposed as conceived from the foregoing grounds, and an aspect of the disclosure is to provide a hydropower generator which has a compact and simple structure and efficiently generates electric energy by arranging multistage blade assemblies along a flow path of a fluid.

Another aspect of the disclosure is to provide a hydropower generator which is quickly and easily installed with low costs, and efficiently generates power of electric energy because the arrangement position and the number of blade assemblies are properly adjustable according to flow amount, flow rate, designed capacity and local conditions.

Still another aspect of the disclosure is to provide a hydropower generator in which multistage power generation is possible even though a curved portion is present in a channel, introduction of foreign materials is prevented, power generation time increases with easy maintenance, and durability and maintenance are improved.

Still another aspect of the disclosure is to provide a hydropower generator which is stably installed in position on a water surface or under water to generate power, and of which installation work is quickly and conveniently performed.

Technical Solution

To achieve the aspect, a hydropower generator according to the disclosure includes: a driving shaft installed along a path through which a fluid flows; a plurality of blade assemblies installed along a lengthwise direction of the driving shaft; a spinning supporter connected to rotatably support the driving shaft; and a power generator receiving a spinning force of the driving shaft and generating electricity.

To achieve the aspect, a hydropower generator according to the disclosure includes: a driving shaft installed along a path through which a fluid flows; a plurality of blade assemblies installed along a lengthwise direction of the driving shaft; a spinning supporter connected to rotatably support the driving shaft; a power generator receiving a spinning force of the driving shaft and generating electricity; and a flow pipeline internally provided with the driving shaft along a lengthwise direction thereof and formed with a channel through which a fluid flows.

The spinning supporter may include: a driving shaft bearing installed in the driving shaft; and a shaft supporting member coupled to the flow pipeline and connecting with the driving shaft bearing.

The spinning supporter may include: a driving shaft bearing installed in the driving shaft; and a shaft supporting member including a supporting hub formed with a center hole in which the driving shaft bearing is installed, a plurality of supports having first ends connected to a circumference of the supporting hub, and a supporting flange formed in second ends of the supports and coupled to the flow pipeline, and the flow pipeline may be provided in plural, the plurality of flow pipelines being arranged in a lengthwise direction and connected to each other.

Further, the spinning supporter may further include a driving shaft connecting member inserted and installed in the shaft supporting member to connect the driving shafts arranged frontward and backward.

Preferably, the driving shaft may include a pipe, and a coupling ring coupled to the pipe and formed with a shaft binding hole at an inner center thereof, the driving shaft connecting member may include a center in which the driving shaft bearing is inserted and opposite sides at which shaft binding protrusions to be connected to the driving shaft are formed, and the shaft binding protrusion may be formed with an uneven protrusion on an outer circumferential surface thereof, and the shaft binding hole is formed with an uneven groove on an inner circumferential surface thereof in which the uneven protrusion is inserted.

The flow pipeline may include a connection flange by which the flow pipelines arranged frontward and backward are connected, and the supporting flange may be interposed and held between the connection flanges.

Meanwhile, the flow pipeline may include a monitoring unit to observe an inside thereof and detect an inner state thereof.

In this case, the monitoring unit may include: an opening for observation and maintenance, which is formed by perforating a portion of the flow pipeline positioned corresponding to an installation portion for the blade assembly; an observation window watertightly coupled to the opening for the observation and the maintenance; and a detector installed in the observation window and detecting an operation state of the blade assembly or a state of a fluid.

To achieve the aspect, a hydropower generator according to the disclosure includes: a driving shaft installed along a path through which a fluid flows; a plurality of blade assemblies installed along a lengthwise direction of the driving shaft; a spinning supporter connected to rotatably support the driving shaft; a power generator receiving a spinning force of the driving shaft and generating electricity; a flow pipeline internally provided with the driving shaft along a lengthwise direction thereof and formed with a channel through which a fluid flows; a curved flow pipe disposed in a curved portion of a channel and connected to the flow pipeline; and a connecting joint member installed inside the curved flow pipe and connecting the driving shafts arranged frontward and backward.

The spinning supporter may include: a driving shaft bearing installed in the driving shaft; and a shaft supporting member including a supporting hub formed with a center hole in which the driving shaft bearing is inserted, a plurality of supports having first ends connected to a circumference of the supporting hub, and a supporting flange formed in second ends of the supports and coupled to the flow pipeline. Further, the curved flow pipe may include a structure that a connection flange shaped corresponding to a connection flange of the flow pipeline is coupled to curved body opposite ends, and the supporting flange may be interposed, coupled and held between the connection flange of the curved flow pipe and the connection flange of the flow pipeline.

Further, the spinning supporters may be disposed in front and back of the curved flow pipe and further include a driving shaft connecting member connected to the driving shaft and inserted and installed in the shaft supporting member, and the connecting joint member may include a first universal joint connected to the driving shaft connecting member positioned at a front side, a second universal joint connected to the driving shaft connecting member positioned at a back side, and a joint shaft connected between the first universal joint and the second universal joint.

To achieve the aspect, a hydropower generator according to the disclosure includes: a driving shaft installed along a path through which a fluid flows; a plurality of blade assemblies installed along a lengthwise direction of the driving shaft; a spinning supporter connected to rotatably support the driving shaft; a power generator receiving a spinning force of the driving shaft and generating electricity; a flow pipeline internally provided with the driving shaft along a lengthwise direction thereof and formed with a channel through which a fluid flows; and an auxiliary spinning maker connected to the driving shaft or the flow pipeline, and formed with a blade in a floating body.

Here, the floating body may include a hollow body formed with an inlet.

Further, the auxiliary spinning maker may be provided in plural, the plurality of auxiliary spinning makers being arranged frontward and backward and connected by a connecting joint member.

In this case, the auxiliary spinning maker may be provided in plural, the plurality of auxiliary spinning makers being arranged frontward and backward and connected to each other by a connecting joint member, and the hydropower generator may further include a tensioner connected to a backmost auxiliary spinning maker among the plurality of auxiliary spinning makers and generating and applying tension.

In this case, the tensioner may include a tension body having a wide-front and narrow-back structure including a flow hole of which an inlet for an inflow of a fluid has a large diameter and an outlet for an outflow of a fluid has a small diameter.

To achieve the aspect, a hydropower generator according to the disclosure includes: a driving shaft installed along a path through which a fluid flows; a plurality of blade assemblies installed along a lengthwise direction of the driving shaft; a spinning supporter connected to rotatably support the driving shaft; a power generator receiving a spinning force of the driving shaft and generating electricity; and a structural supporter disposed along the lengthwise direction of the driving shaft and coupled to the spinning supporter.

The spinning supporter may include a driving shaft bearing installed in the driving shaft; and a supporting hub formed with a center hole in which the driving shaft bearing is installed, a plurality of supports having first ends connected to a circumference of the supporting hub, a shaft supporting member formed in second ends of the support, and a driving shaft connecting member inserted and installed in the shaft supporting member to connect the driving shafts arranged frontward and backward, and the structural supporter may include a plurality of support structural pipes installed in the shaft supporting member by a pipe coupling member.

To achieve the aspect, a hydropower generator according to the disclosure includes: a driving shaft installed along a path through which a fluid flows; a plurality of blade assemblies installed along a lengthwise direction of the driving shaft; a spinning supporter connected to rotatably support the driving shaft; a power generator receiving a spinning force of the driving shaft and generating electricity; a flow pipeline internally provided with the driving shaft along a lengthwise direction thereof and formed with a channel through which a fluid flows; and a shredder installed in the flow pipeline and shredding foreign materials introduced therein.

Here, the power generator may include: a power generator housing installed in the flow pipeline; a power transmission device connected to the driving shaft and transmitting a spinning force; and a generator unit installed in the power generator housing and generating electrical energy while spinning based on a force received as connected to the power transmission device.

The power transmission device may include: a large diameter input pulley disposed inside the power generator housing and receiving a spinning force from the driving shaft; a small diameter output pulley disposed in the power generator housing and installed in a rotary shaft of the generator; and a belt connected to the large diameter input pulley and the small diameter output pulley. Here, the hydropower generator may further include: a power transmission shaft connected between the large diameter input pulley and the driving shaft and transmitting a spinning force, wherein opposite ends of the power transmission shaft are disposed in front and back of the power generator housing and rotatably supported by the spinning supporter and connected to the flow pipeline.

Meanwhile, the power generator may include: a power transmission device connected to the driving shaft and transmitting a spinning force; and a generator generating electrical energy while spinning based on a force received as connected to the power transmission device.

Here, the power transmission device may include: a driving gear installed in the driving shaft; a power-transmission gear meshing with the driving gear; a power transmission shaft coupled to the power-transmission gear; and an overdrive gearing unit connected to the power transmission shaft and transmitting a spinning force to a rotary shaft of the generator.

In this case, the overdrive gearing unit may include a first overdrive gear connected to the power transmission shaft, and a second overdrive gear meshing with the first overdrive gear and connected to the rotary shaft of the generator, and the driving gear and the power-transmission gear may include bevel gears to mesh with each other, and the first overdrive gear and the second overdrive gear may include bevel gears to mesh with each other.

Meanwhile, the blade assembly may include: at least one blade formed with a blade bracket in a blade portion; and a blade connecting member connected to the driving shaft and coupling with the blade bracket.

Here, the driving shaft may include a pipe, and a coupling ring coupled to the pipe and formed with a shaft binding hole at an inner center thereof, the blade connecting member may include a bracket connector formed at a center thereof to which the blade bracket is fastened, and a shaft binding protrusion formed frontward and backward and connected to the driving shaft, and the blade bracket may include a bracket coupling protrusion, the bracket connector includes a bracket coupling groove in which the bracket coupling protrusion is inserted, the shaft binding protrusion includes an uneven protrusion on an outer circumferential surface, and the coupling ring includes an uneven groove to insert the uneven protrusion therein on an inner circumferential surface of a shaft binding hole.

Meanwhile, the hydropower generator may further include a foreign-material blocking member installed in an entrance of the flow pipeline to prevent foreign materials from being introduced therein.

In this case, the foreign-material blocking member includes a foreign-material removing screw formed by spirally turning a band member, a mooring fastener formed at a front end of the foreign-material removing screw and formed with a towing hole, and a screw flange formed at a rear end of the foreign-material removing screw.

Further, the hydropower generator may further include a shredder shredding foreign materials introduced into the flow pipeline, wherein the shredder is provided in plural, the plurality of shredders are installed at a front side of a frontmost flow pipeline among the connected flow pipelines, or respectively installed at the front side of the frontmost flow pipeline and installed at a back side of a backmost flow pipeline among the connected flow pipelines.

The shredder may include: a rotatable cutter assembly rotatably installed inside the flow pipeline and including a plurality of rotary cutters; and a stationary cutter assembly disposed opposite to the rotary cutter and including a plurality of stationary cutters.

Meanwhile, the hydropower generator may further include: a bypass pipeline device branched and formed from the flow pipeline.

Here, the bypass pipeline device may include a first T-shaped pipeline connected to a frontmost end of the flow pipeline, a second T-shaped pipeline connected to a backmost end of the flow pipeline, a bypass pipeline connected between the first T-shaped pipeline and the second T-shaped pipeline, a first control valve installed to come into contact with the first T-shaped pipeline to prevent flow toward the flow pipeline, a second control valve installed to the bypass pipeline, and a third control valve installed to the backmost end of the flow pipeline.

To achieve the aspect, the hydropower generator according to the disclosure may further include a buoyant body coupled to provide buoyancy.

Further, the hydropower generator may further include: a buoyant body coupled to provide buoyancy; and an anchor installed to be anchored in position under water.

In this case, the anchor may include an anchor body including an anchoring body formed with an internal spacing portion in which a material of high specific gravity is inserted, mooring fasteners formed at front and rear ends of the anchor body and having towing holes, and a plurality of hooks protruding from an outer surface of the anchoring body.

Further, the anchor may include a plurality of pipeline fastening hooks fastened to the flow pipeline.

To achieve the aspect, the hydropower generator according to the disclosure may further include a buoyant body coupled to provide buoyancy, wherein the buoyant body includes a buoyant-body fastening bracket installed in the flow pipeline, and a floating unit connected to the buoyant-body fastening bracket.

Further, the hydropower generator may further include: a buoyant body coupled to provide buoyancy; and a moorer including a tying member tied to the buoyant body, and a towing device for applying a pulling force to the tying member.

Advantageous Effects

In a hydropower generator according to the disclosure, driving shafts coupling with blade assemblies are internally provided in flow pipelines and connected to each other to be arranged in a multistage structure, thereby having effects on generating electricity by repetitively using a restricted fluid load, and maximizing a power output because high torque caused by a plurality of blade assemblies is used to get electrical energy.

In this case, the driving shaft is stably supported by a spinning supporter, and thus the arrangement position and the number of blade assemblies are properly adjustable along a channel, thereby having effects on achieving a high-efficiency power generation system which is suitable for a flow amount, a flow rate, designed capacity, and local conditions and structurally stable.

Further, in a hydropower generator according to the disclosure, electrical energy is harvested by a single generator based on a torque given in units of a spinning unit in which a plurality of blade assemblies are multistage-arranged, and the flow pipeline has a compact and simple structure in which the driving shafts with the plurality of blade assemblies are internally provided excluding complicated devices, thereby having advantages of remarkably reducing production costs, construction costs and maintenance costs because it is lightweight.

Further, in a hydropower generator according to the disclosure, a monitoring unit for observation and maintenance is provided in a portion of a flow pipeline where a lade assembly is installed in order to observe and detect an operation state and maintain a stable operation state, and a foreign-material blocking member and a shredder are provided in an inlet of a fluid so as to prevent foreign materials from being introduced into the blade assembly, thereby having advantages of preventing a failure and thus improving durability.

In particular, in a hydropower generator according to the disclosure, it is possible to divide a power generating apparatus into blocks in such a manner that the plurality of blade assemblies is coupled to the flow pipeline manufactured suitable for the length, size, standards, etc. of the channel, and it is possible to quickly and conveniently install the hydropower generator by a block assembling method without assembling parts one by one in a poor site, so that construction costs can be remarkably reduced by a shortened installation period and decreased man hour, and installation accuracy and construction uniformity can be secured between the flow pipeline and the blade assembly, thereby expecting improvement in durability and enhancement in a power-generation efficiency.

Meanwhile, in a hydropower generator according to the disclosure, even though a flow path of a fluid is curved along a form of a river or a landform, a curved flow pipe is installed corresponding to a radius of a curved portion and the connecting joint member is internally installed and connected, so that a front driving shaft and a back driving shaft can operate as a single body to transfer the spinning force to a power generator, thereby effectively achieving a hydropower generation system regardless of the landform and the like outside conditions.

Further, a hydropower generator according to the disclosure includes an anchor, a buoyant body and a moorer to be stably installed and be in position on a water surface or under water, thereby having advantages of quickly and easily carrying out installation work.

In addition, in a hydropower generator according to the disclosure, flow pipelines internally provided with blade assemblies are multistage-arranged and an auxiliary spinning maker is connected to a driving shaft so that a spinning force can be additionally generated and applied, thereby further improving a power generation efficiency.

DESCRIPTION OF DRAWINGS

FIG. 13b is an enlarged perspective view of "K" in FIG. 13a, and FIG. 13c is a partial cross-section view of "L" in FIG. 13a.

REFERENCE NUMERALS

Figure 1:
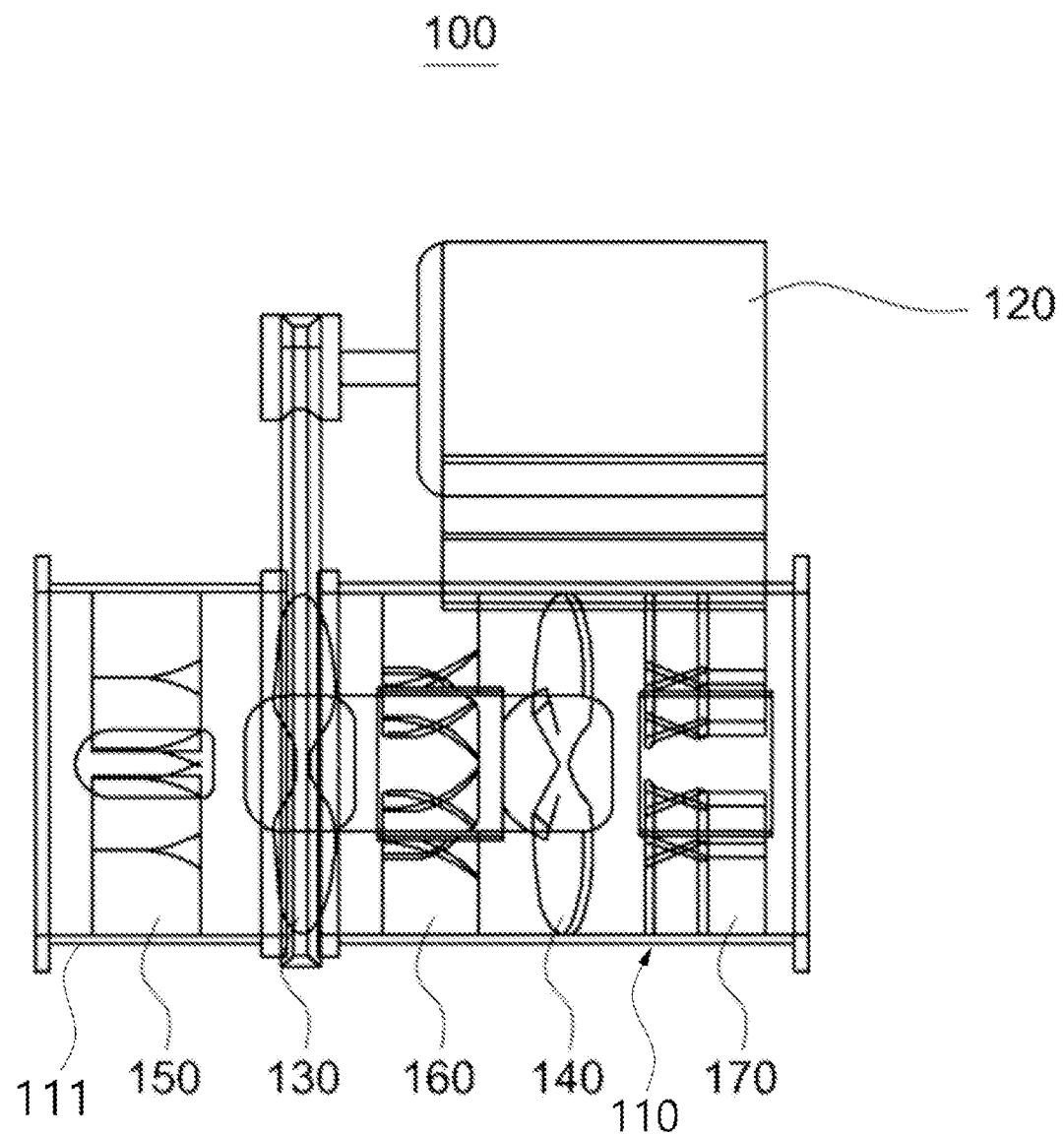
FIG. 1 is a view for describing a conventional small hydropower generator.

1: flow pipeline
2: driving shaft
3: blade assembly
4: spinning supporter
5: power generator
6: bypass pipeline device
7: curved connector
8: structural supporter
9: shredder
10: anchor
11: buoyant body
12: moorer
13: auxiliary spinning maker
14: tensioner

BEST MODE

Below, exemplary embodiments of the disclosure will be described in detail based on the accompanying drawings FIGS. 2 to 13c, in which like numerals refer to like elements throughout FIGS. 2 to 13c. Meanwhile, illustrations and detailed descriptions about the elements that can be easily understood by those skilled in this field from the general art and the operations and effects thereof are simplified and omitted in the drawings, and illustration is made focusing on parts related to the disclosure.

Figure 2:
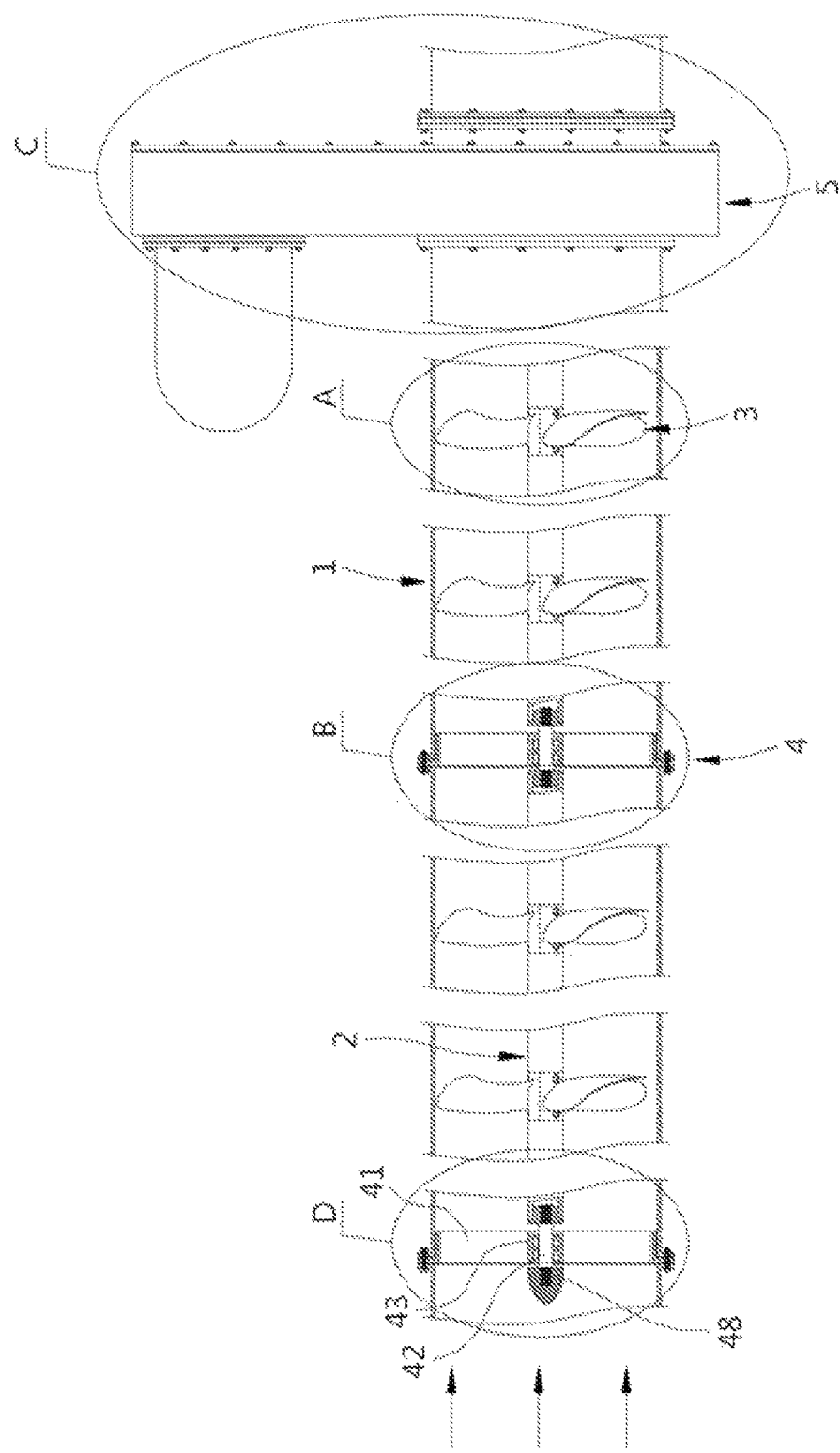
FIG. 2 is a view schematically showing the whole structure of a hydropower generator according to a first embodiment of the disclosure.

FIG. 2 is a view schematically showing the whole structure of a hydropower generator according to a first embodiment of the disclosure, in which the hydropower generator is so long that it is partially cut open to show its internal structure and cross-sections (B and D) with omitted portions along the lengthwise direction.

Referring to FIG. 2, the hydropower generator according to the first embodiment of the disclosure includes a flow pipeline 1, a driving shaft 2, a blade assembly 3, a spinning supporter 4, and a power generator 5, and is characterized in that a spinning force applied in units of a spinning unit, in which the driving shaft 2 is disposed along a flow path of a fluid and multistage blade assemblies are arranged in the driving shaft 2, is used in generating power through a single generator.

Figure 3A:
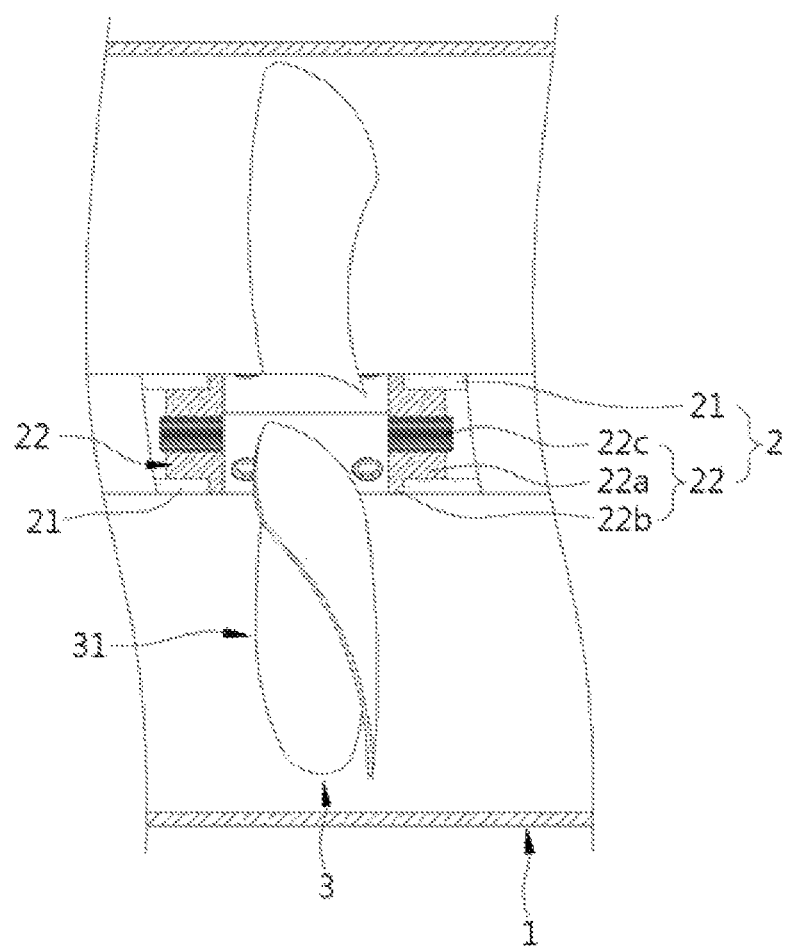
FIG. 3a is an enlarged view of "A" in FIG. 2 with a partial cross-section thereof.
Figure 3B:
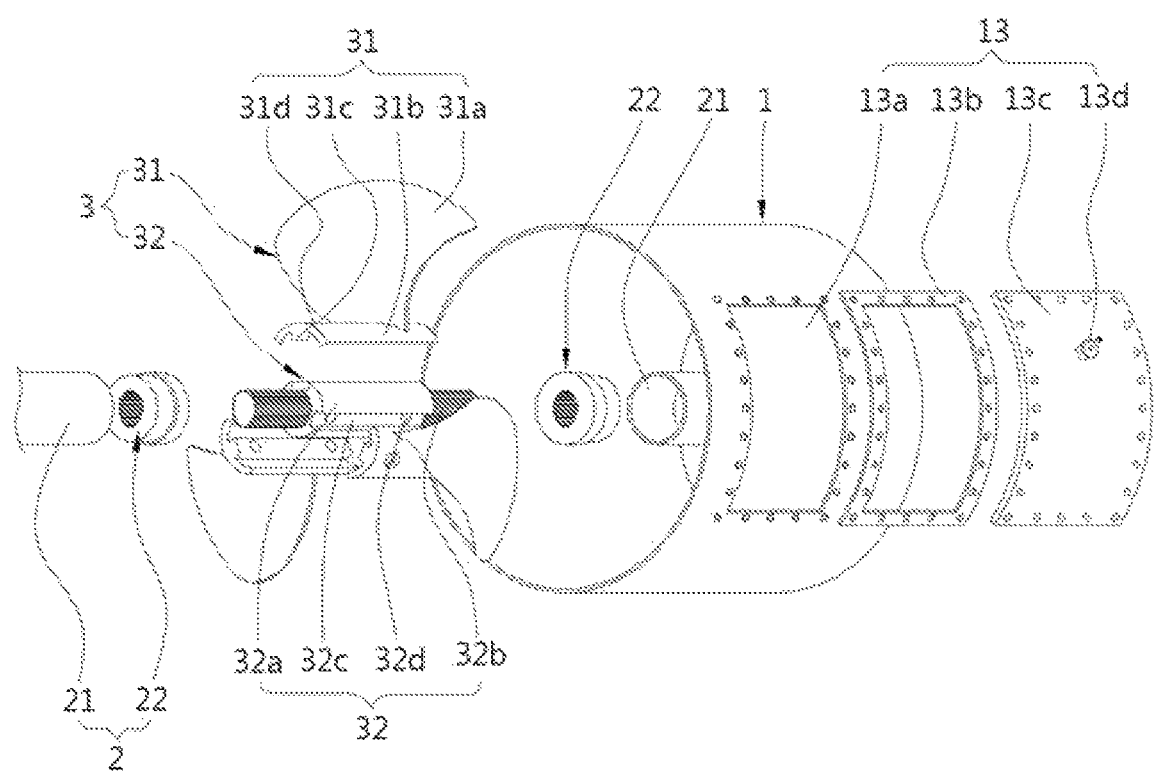
FIG. 3b is an exploded perspective view of "A" in FIG. 2.
Figure 3C:
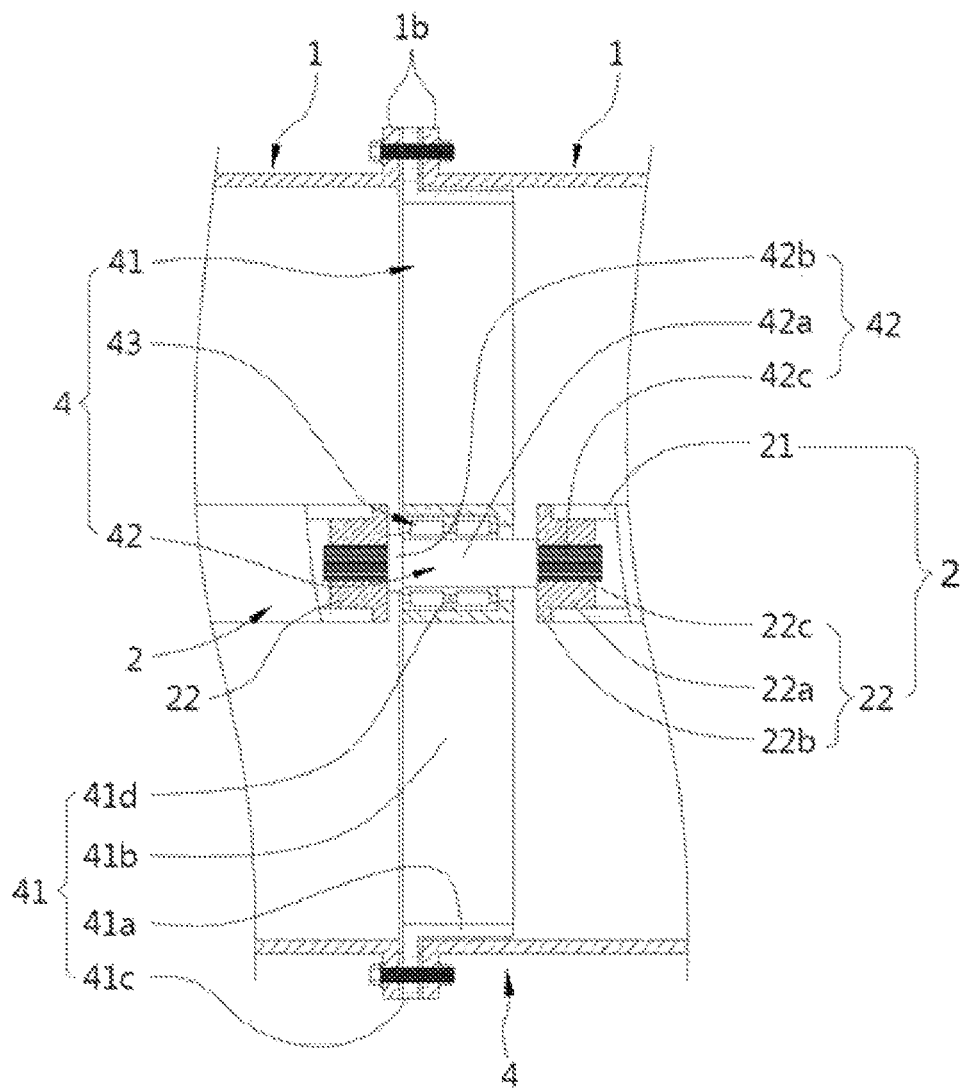
FIG. 3c is an enlarged view of "B" in FIG. 2.
Figure 3D:
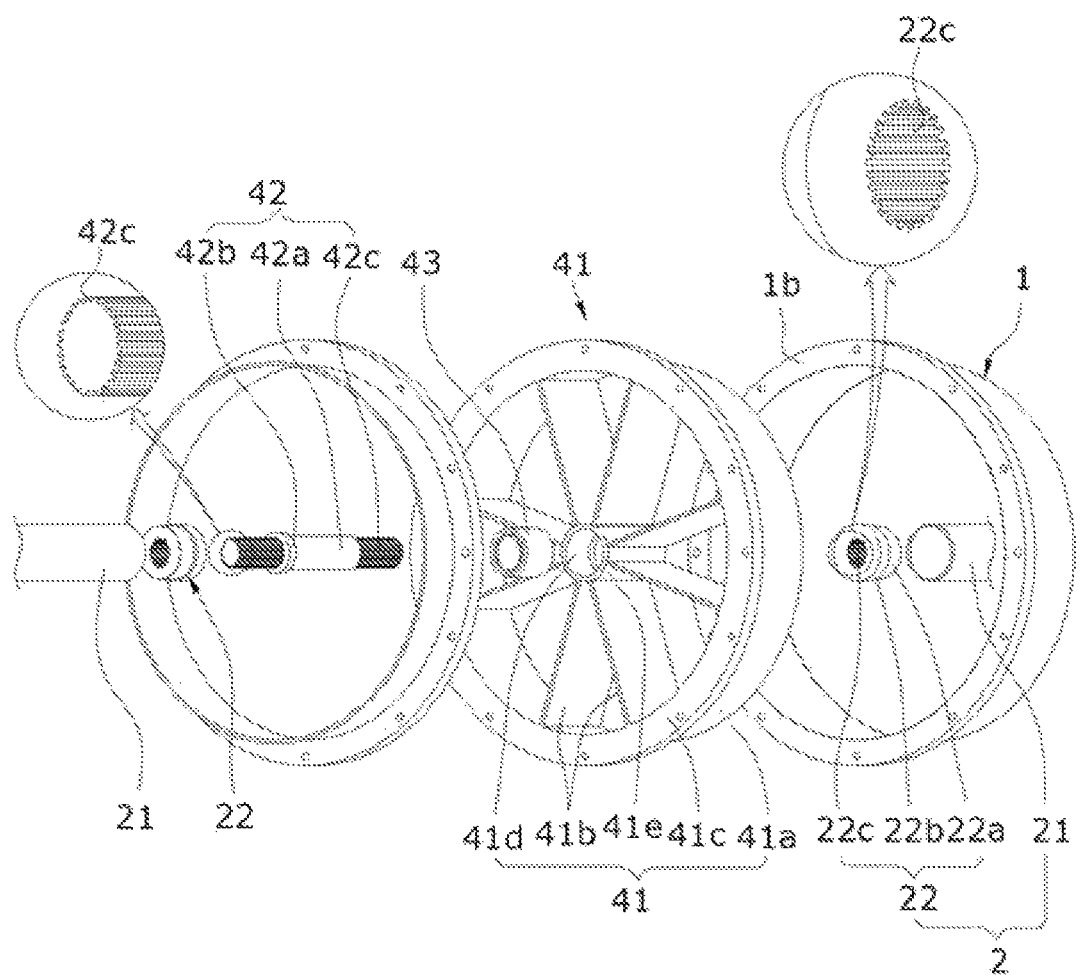
FIG. 3d is an exploded perspective view of "B" in FIG. 2.

FIG. 3a is an enlarged view of "A" in FIG. 2 with a partial cross-section thereof, FIG. 3b is an exploded perspective view of "A" in FIG. 2, FIG. 3c is an enlarged view of "B" in FIG. 2, and FIG. 3d is an exploded perspective view of "B" in FIG. 2.

Referring to FIG. 2 and FIG. 3a, the flow pipeline 1 refers to a pipeline member formed with a channel through which a fluid flows, and may have various shapes like a square tube, etc. However, the flow pipeline 1 in this embodiment may be selected among circular tubes on the market according to the kinds of fluids, temperatures of a fluid, flow amounts, flow rates, designed capacities, local conditions, etc.

The flow pipeline 1 couples with flow pipelines consecutively arranged by binding connection flanges 1b as shown in the enlarged view of FIG. 3c, in which the connection flanges 1b are connected to each other in a state that a supporting flange 41c of a shaft supporting member 41 (to be described later) is interposed between the connection flanges 1b.

Further, as shown in FIG. 3b, the flow pipeline 1 is provided with a monitoring unit 13 for observing the inside thereof or sensing or monitoring an operation state or the like of the driving shaft or blade assembly provided therein.

The monitoring unit 13 includes an opening 13a for observation and maintenance, which is formed by perforating a portion of the flow pipeline corresponding to a position where the blade assembly 3 is installed, an observation window 13c fastened to the opening 13a for the observation and maintenance by a bolt or the like fastening member, and a detector 13d installed in the observation window 13c.

Here, the observation window 13c may be made of a transparent material to facilitate the observation, and provided with a watertight member 13b such as a gasket pad for watertight coupling to prevent water leakage.

Further, the detector 13d includes a spinning speed sensor for sensing the spinning speed of the blade assembly 3, but is not limited thereto. Alternatively, the detector 13d may include various kinds of sensors such as a flow rate sensor for sensing a flow rate, a temperature sensor for sensing temperature of a fluid, etc. Here, the spinning speed sensor may employ a revolutions-per-minute (RPM) sensor for detecting a moving speed based on change in intensity of a magnetic field, an optical sensor for detecting a spinning speed based on a received state of light, etc.

The driving shaft 2 refers to a shaft which is disposed inside the flow pipeline 1 and rotatably supported by the spinning supporter 4, and may be selected without any special limit as long as it is a shaft member in which the blade assembly 3 is installable. For example, the driving shaft 2 includes a pipe 21 placed between the blade assembly 3 and the spinning supporter 4, and a coupling ring 22 coupled to an end portion of the pipe and used in connecting the blade assembly 3 and the spinning supporter 4.

Further, as shown in FIG. 3a to FIG. 3c, the coupling ring 22 is formed with a shaft binding hole 22c formed with an uneven groove (i.e. a serration) so that an uneven protrusion (i.e. a serration) of the shaft binding protrusion 32b or 42c of a blade connecting member 32 or the driving shaft connecting member 42 (to be described later) can be inserted in a central inside of a circular coupling ring body 22a having a stepped portion 22b. Here, the shaft binding protrusion 32b or 42c (to be described later) is approximately shaped like a spline shaft formed with the serration, and therefore the shaft binding hole 22c is also formed with the serration so as to be engaged with the shaft binding protrusion 32b or 42c.

A plurality of blade assemblies 3 are arranged along the lengthwise direction of the driving shaft 2 and spin when a fluid flows. The blade assemblies 3 are inserted in the flow pipeline 1 and fastened and installed to the driving shaft 2 by a bolt or the like fastening member. The number of blade assemblies 3 to be installed and spaced apart at regular intervals is properly varied depending on a flow amount, a flow rate, a designed capacity, local conditions, etc. In this case, a vortex occurs when a blade 31 rotates, and therefore the blade assemblies 3 can be installed to be spaced apart from each other in such a manner that a rear blade assembly can be positioned at a place where the vortex occurring in a front blade assembly dissipates, thereby taking a power generation efficiency into account.

Further, as shown in FIG. 3a and FIG. 3b, the blade assembly 3 inserted in the flow pipeline 1 and fastened and installed to the driving shaft 2 by the fastening member includes at least one blade 31, and the blade connecting member 32 to which the blade 31 is connected.

The blade 31 includes a blade portion 31a with which a fluid comes into contact, and a blade bracket 31b coupled to a root portion of the blade portion 31a. Further, the blade bracket 31b is formed with a bracket coupling protrusion 31c protruding from an inside of a bracket main body having an approximately arc-shaped cross-section, and a fastening hole 31d formed by perforating the bracket main body.

The blade connecting member 32 is formed with a bracket connector 32a having a central portion to which the blade bracket 31b is fastened, and the shaft binding protrusion 32b coupled to the driving shaft 2 at the front and back thereof. Here, the shaft binding protrusion 32b is formed with the uneven protrusion (i.e. the serration) to be inserted in the shaft binding hole 22c of the foregoing coupling ring 22 on the outer circumferential surface.

Further, the bracket connector 32a is formed to have a structure where a bracket coupling groove 32c is recessed to insert the bracket coupling protrusion 31c therein. The bracket coupling groove 32c is formed with a fastening hole 32d to which a fastening member is fastened passing through the blade bracket 31b.

As described above, the blade bracket 31b of the blade 31 is formed with the bracket coupling protrusion 31c, and the bracket connector 32a of the blade connecting member 32 is formed with the bracket coupling groove 32c. Therefore, when the bracket coupling protrusion 31c and the bracket coupling groove 32c are engaged with each other, they can be more firmly fastened than those fastened by a bolt fastening method, thereby having an advantage of stably maintaining a fastening state even through a high spinning load is applied thereto.

Meanwhile, the blade assembly 3 may selectively employ various types of blades, such as a lift-type blade spinning by a lifting force when a fluid flows, a drag-type blade spinning by a dragging force as a fluid flows, a combination-type blade where the lift-type blade and the drag-type blade are mixed, etc. without limitations. In a place where a fluid flows in a certain direction, asymmetric blades efficient in both drag and lift may be installed according to the speed of the fluid. In a tidal current place where flow of a fluid is altered with a time gap therebetween, symmetric blades may be installed according to the speed of the fluid.

For example, the blade portion 31a of the blade assembly 3 may employ lift-type asymmetric blades for a channel where a fluid flows in a certain direction with a relatively high flow rate, may employ drag-type asymmetric blades for a channel where a fluid flows in a certain direction with a relatively low flow rate, and may employ lift- and drag-type symmetric blades for a tidal-current place where a flowing direction of a fluid alternates between forward and backward directions leaving a time gap.

Meanwhile, the spinning supporter 4 refers to an element for rotatably supporting the driving shaft 2, and detailed descriptions thereof will be made with reference to FIG. 3c and FIG. 3d.

The spinning supporter 4 may be formed to have various structures without any special restrictions as long as it can rotatably support the driving shaft 2. In this embodiment, as shown in FIG. 3c and FIG. 3d, the spinning supporter 4 includes the shaft supporting member 41, the driving shaft connecting member 42, and a driving shaft bearing 43 to thereby carry out both the connection of the fluid pipeline 1 and the support of the driving shaft 2 without complicated connecting and installing work.

The shaft supporting member 41 refers to a member that is coupled to the flow pipeline 1 and approximately shaped like a wheel to which the driving shaft bearing 43 is connected, and includes a supporting hub 41e formed with a center hole 41d at the center thereof to install the driving shaft bearing 43 therein; a plurality of supports 41b equiangularly arranged to form flow holes, through which a fluid flows, therebetween, and having first ends connected to the circumference of the supporting hub 41e; a ring-shaped body 41a formed on second ends of the supports 41b; and the supporting flange 41c formed at one side of the ring-shaped body 41a and interposed between the connection flanges 1b of the flow pipeline 1 at the connecting work. Here, the center hole 41d of the supporting hub 41e is formed with a center-hole stepped portion protruding from the inner circumference thereof to prevent the bearing from separation as shown in FIG. 3c.

The driving shaft connecting member 42 refers to a member inserted and installed at the center of the shaft supporting member 41 to connect the driving shafts 2 arranged forward and backward as shown in FIG. 3d, in which a bearing settling protrusion 42b protrudes from one side of a cylindrical rod-shaped body 42a rotatably installed to the center hole 41d and shaft binding protrusions 42c are connected to the front and back of the driving shaft. Here, as shown in the enlarged view of FIG. 3d, the shaft binding protrusion 42c is formed with the protrusion (i.e. the serration) on the outer circumference thereof, and thus engaged with the uneven groove (i.e. the serration) of the shaft binding hole 22c formed in the coupling ring 22 of the driving shaft 2.

Figure 3E:
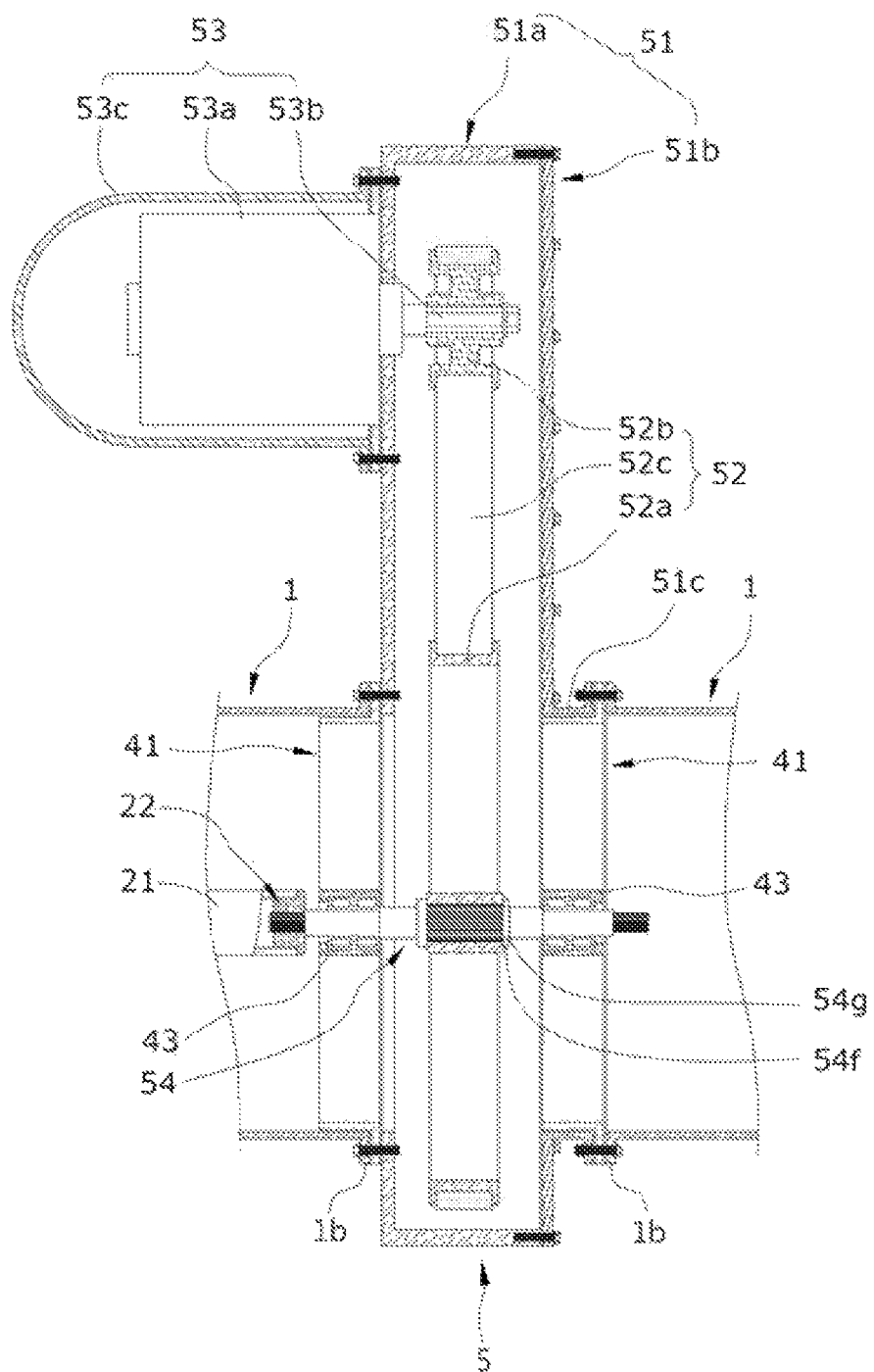
FIG. 3e is an enlarged cross-section view of "C" in FIG. 2.
Figure 3F:
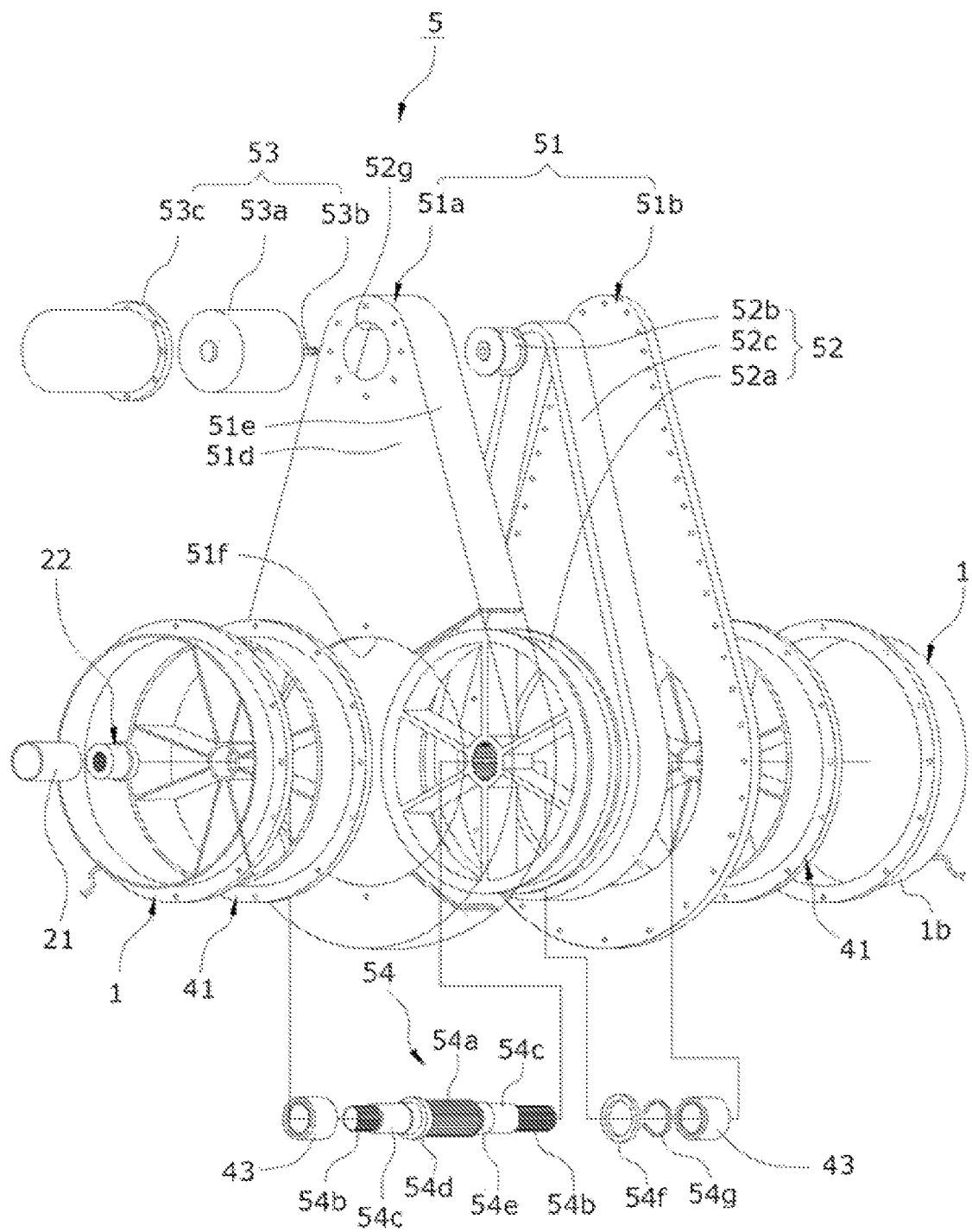
FIG. 3f is an exploded perspective view of C" in FIG. 2.

FIG. 3e is an enlarged cross-section view of "C" in FIG. 2, and FIG. 3f is an exploded perspective view of C" in FIG. 2.

Referring to FIG. 3e and FIG. 3f, the power generator 5 refers to an element for receiving the spinning force of the driving shaft 2 and generating and harvesting electricity, and its structure or shape is not specially restricted as long as it can convert the spinning force of the driving shaft 2 into electrical energy. In this embodiment, the power generator 5 includes a power generator housing 51, a power transmission device 52, and a generator unit 53.

The power generator housing 51 refers to a member connected to the flow pipeline 1 in the state that the spinning supporter 4 is inserted in front and back thereof, and includes a first power generation casing 51a formed to have an approximately cone shape when it is viewed from the front, and a second power generation casing 51b coupled to the back of the first power generation casing 51a.

As shown in FIG. 3f, the first power generation casing 51a includes a front plate 51d, and a lateral plate 51e perpendicularly bent and extended from the edge of the front plate 51d. The front plate 51d is formed with a through hole 51f, through which a fluid flows, in a lower portion thereof, and a generator installation hole 52g, in which a generator 53a is installed, in an upper portion thereof. Further, fastening holes are formed around the through hole 51f, the generator installation hole 52g and the edge of the lateral plate 51e.

The second power generation casing 51b refers to a plate member corresponding to the lateral plate 51e of the first power generation casing 51a and formed with a through hole for being fastened to the lateral plate 51e, and includes a connection flange portion 51c protrudes behind the through hole.

The power transmission device 52 refers to an element connected to the driving shaft 2 and transmitting the received spinning force to the generator, and is achieved by a belt power transmission method of transmitting power based on a belt.

In more detail, the power transmission device 52 includes a large diameter input pulley 52a installed at an end portion of the driving shaft 2 and formed to have a relatively large diameter, a small diameter output pulley 52b installed to a rotary shaft 53b of the generator 53a (to be described later) and formed to have a smaller diameter than the large diameter input pulley 52a, and a belt 52c connected to the large diameter input pulley 52a and the small diameter output pulley 52b.

Further, the large diameter input pulley 52a couples with a power transmission shaft 54 connected to the driving shaft 2, and is formed with an uneven groove (i.e. a serration) at a center hub thereof to be engaged with an uneven protrusion (i.e. a serration) formed in a pulley coupling portion 54a.

The power transmission shaft 54 is, as shown in FIG. 3f, formed with the pulley coupling portion 54a formed at the center of the transmission shaft body shaped like a cylindrical rod so as to be connected to the large diameter input pulley 52a, shaft binding protrusions 54b formed to be connected to the coupling ring 22 of the driving shaft 2 at the front and back of the transmission shaft body, and bearing connecting portions 54c formed between the pulley coupling portion 54a and the front and back the shaft binding protrusions 54b and installed with the driving shaft bearing 43 of the spinning supporter 4.

Further, the pulley coupling portion 54a is formed with the uneven protrusion (i.e. the serration) on the outer circumferential surface thereof, a separation preventing protrusion 54d protruding from one side thereof, and a settling portion 54e protruding from the other side thereof and coupling with a fastening ring 54f and an E-ring 54g (to be described later).

Further, the power transmission shaft 54 includes the fastening ring 54f to be fastened to the settling portion 54e of the pulley coupling portion 54a, and the E-ring 54g to be in contact with and coupled to the fastening ring 54f.

Meanwhile, the generator unit 53 refers to an element that is connected to the power transmission device 52 and rotated by the transmitted power to generate power with electric energy, and includes the generator 53a provided with the rotary shaft 53b, and the watertight casing 53c formed to cover the outside of the generator 53a and coupled to the first power generation casing 51a, thereby preventing a fluid from flowing herein.

Figure 3G:
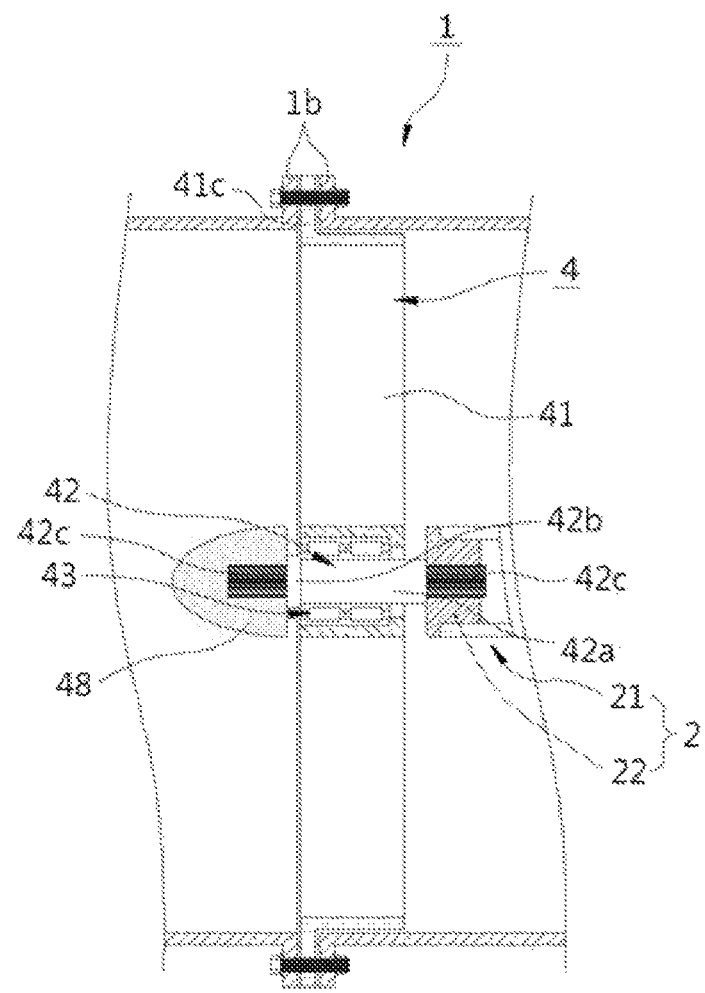
FIG. 3g is an enlarged view of "D" in FIG. 2.

FIG. 3g is an enlarged view of "D" in FIG. 2, and shows a cross-sectional view of the spinning supporter 4 installed in an entrance portion of the flow pipeline 1 and supporting the driving shaft 2.

Referring to FIG. 3g, the spinning supporter 4 includes the shaft supporting member 41, the driving shaft connecting member 42, and the driving shaft bearing 43, and further includes a resistance dwindling member 48 installed in the driving shaft connecting member 42 corresponding to the entrance portion of the flow pipeline 1.

The resistance dwindling member 48 is formed as an approximately cone-shaped cap and serves to dwindle resistance and minimize occurrence of a vortex when a fluid flows.

Below, operations of a hydropower generator according to a first embodiment of the disclosure will be briefly described.

First, an assembling process for the hydropower generator according to the first embodiment of the disclosure is as follows. As shown in FIG. 2, the blade assemblies 3 are assembled to the driving shaft 2 at fixed intervals according to the flow amount of the fluid, the flow rate, the designed capacity, the local conditions, etc. and inserted and arranged in the flow pipeline 1. Then, the driving shaft bearing 43 and the driving shaft connecting member 42 are inserted in the supporting hub 41e of the shaft supporting member 41, and the driving shafts 2 arranged forward and backward are connected to each other in such a manner that the shaft binding protrusion 42c of the driving shaft connecting member 42 is inserted in and coupled to the coupling ring 22 of the driving shaft 2.

Further, when the front and back connection flanges 1b of the flow pipeline 1 are fastened to each other by bolts in the state that the supporting flange 41c of the shaft supporting member 41 is interposed between the front and back connection flanges 1b, the adjacent flow pipelines 1 are connected to each other. In this manner, the plurality of flow pipelines 1 are arranged and assembled along the moving direction of the fluid.

When a fluid flows in such an assembled flow pipeline 1, the blade assembly 3 spins by the load of the fluid causes, and thus the driving shaft 2 coupling with the blade assembly 3 also spins, thereby causing the power generator 5 installed at the end of the flow pipeline to generate electric power as shown in FIG. 2, FIG. 3e and FIG. 3f.

In more detail, the operations of the power generator 5 are as follows. The spinning force of the driving shaft 2 interlocking with the spinning of the blade assemblies 3 is transferred to the large diameter input pulley 52a via the power transmission shaft 54, and thus the coupled belt 52c rotates the small diameter output pulley 52b while performing a caterpillar track motion, so that the small diameter output pulley 52b can rotate the rotary shaft 53b, thereby allowing the generator 53a to generate electric power.

Further, the hydropower generator according to the first embodiment can obtain high output electric energy of even though a restricted fluid flows through the flow pipeline 1 because the driving shafts 2 coupling with the plurality of blade assemblies 3 are installed in every flow pipeline 1 and connected to each other to be arranged as a multistage structure to thereby repetitively use fluid load and cause high torque.

Figure 4:
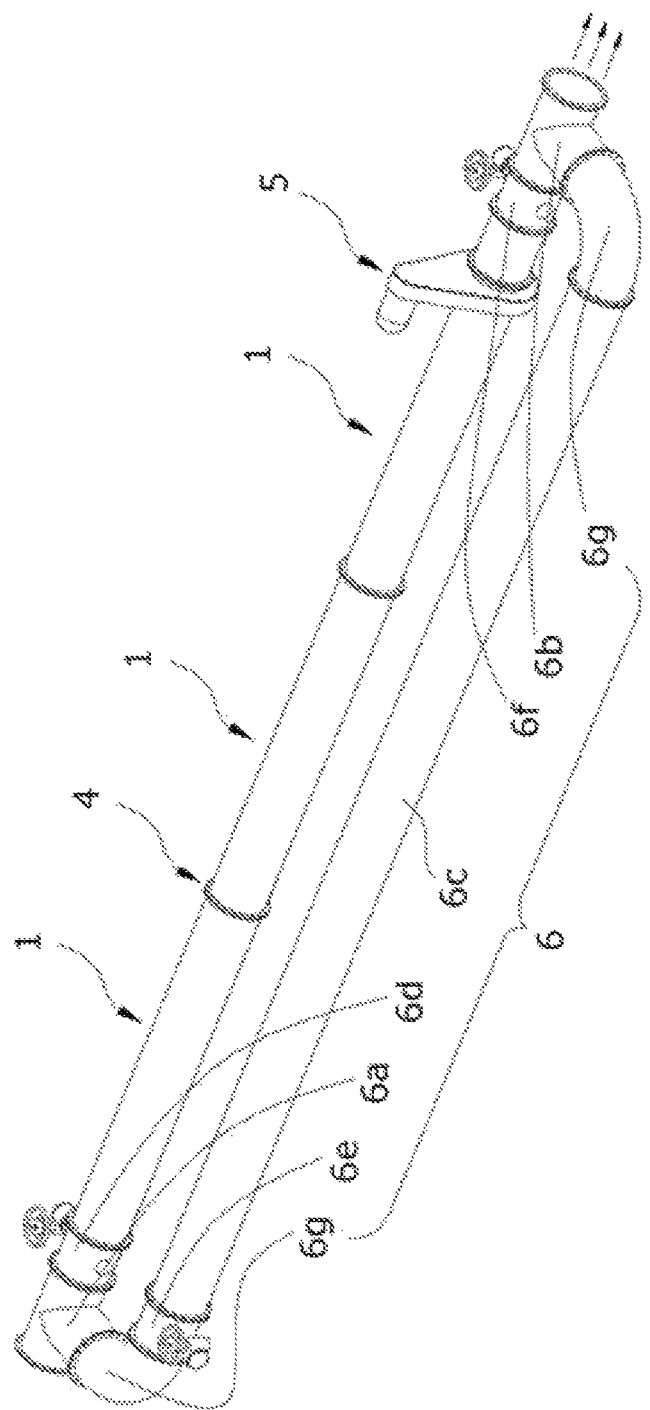
FIG. 4 is a view for describing a first alternative example of the hydropower generator according to the first embodiment of the disclosure.

FIG. 4 is a view for describing a first alternative example of the hydropower generator according to the first embodiment of the disclosure, which is a perspective views showing a general outer-appearance structure of the installed hydropower generator.

Referring to FIG. 4, the hydropower generator according to the first alternative example of the first embodiment is characterized in that a means for preventing a fluid from flowing into the flow pipeline 1 is provided when the blade assembly 3 or the like is needed to stop operating for the purpose of maintenance, and thus additionally includes a bypass pipeline device 6 branched from a front end of the flow pipeline 1 as shown in FIG. 4.

The bypass pipeline device 6 includes a first T-shaped pipeline 6a connected to the frontmost end of the flow pipeline 1 and having an approximately 'T' shape, a second T-shaped pipeline 6b connected to the backmost end of the flow pipeline, a bypass pipeline 6c connected between the first T-shaped pipeline 6a and the second T-shaped pipeline 6b, a first control valve 6d installed to come into contact with the first T-shaped pipeline 6a to prevent flow toward the flow pipeline 1, a second control valve 6e installed to the bypass pipeline 6c, and a third control valve 6f installed to the backmost end of the flow pipeline 1. Further, the bypass pipeline 6c is connected to the first and second T-shaped pipelines 6a and 6b by elbows 6g connected to the front and back thereof.

The hydropower generator according to the first alternative example shown in FIG. 4 can generate electric power as a fluid flows in only the flow pipeline 1 to make the blade assembly 3 spin so that the spinning force of the driving shaft 2 interlocking with the blade assembly 3 can be transferred to the power generator 5, when the first control valve 6d and the third control valve 6f are controlled to be opened and the second control valve 6e is controlled to be closed to generate electric power by making the fluid flow in the flow pipeline 1.

On the other hand, when the first control valve 6d and the third control valve 6f are closed and the second control valve 6e is opened for maintenance or the like, the fluid flows detouring to the bypass pipeline 6c and the fluid is prevented form flowing into the flow pipeline 1, so that the maintenance for the driving shaft 2, the blade assembly 3, the power generator 5, etc. inside the flow pipeline can be easily performed.

In addition, the bypass pipeline 6c is internally provided with the driving shaft to which the blade assembly is coupled, so that electric energy can be continuously generated even while the maintenance of the flow pipeline 1 is performed.

Figure 5:
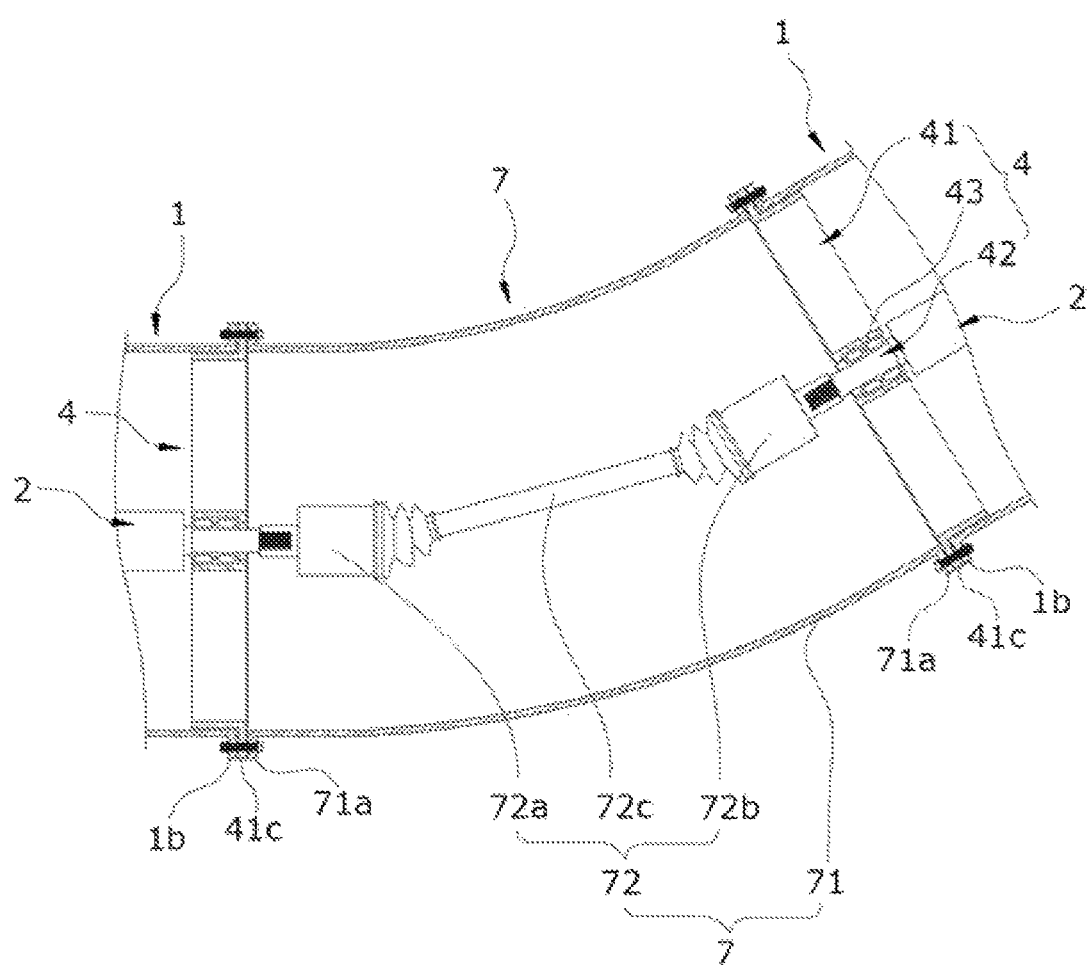
FIG. 5 is a view for describing a second alternative example of the hydropower generator according to the first embodiment of the disclosure.

FIG. 5 is a view for describing a second alternative example of the hydropower generator according to the first embodiment of the disclosure, in which illustration of parts having the same or similar structure to those of the foregoing first embodiment is omitted and only different parts are cut-open and illustrated with partial cross-sectional structures thereof for understanding.

Referring to FIG. 5, the hydropower generator according to the second alternative example of the first embodiment of the disclosure includes the flow pipeline 1 having a channel in which a fluid flows, the driving shaft 2 installed along the lengthwise direction of the flow pipeline 1, the blade assembly 3 installed inside the flow pipeline 1, and the spinning supporter 4 connected to rotatably support the driving shaft 2, and further includes a curved connector 7 provided with a curved flow pipe 71 and the connecting joint member 72 so that the multistage blade assemblies 3 can be arranged by connecting the driving shafts 2 to generate power while maintaining the flow of the fluid even though the flow path of the fluid is curved.

The curved flow pipe 71 refers to an element shaped like a curved pipe to be connected to a curved portion of the flow pipeline 1, and has a structure that connection flanges 71a are coupled to both ends of a body shaped corresponding to the flow pipeline.

Further, the curved flow pipe 71 is formed to have various angles such as 15°, 45°, etc. according to radii of curvature that the flow path has. In this embodiment, the flow pipeline 1 is provided as a circular pipe, and thus the curved flow pipe 71 is formed to have a circular pipe curved at an angle of about 15° while having the same inner diameter as that of the flow pipeline 1.

Further, the curved flow pipes 71 are coupled to each other in the state that the spinning supporters 4 are arranged at both ends of the curved flow pipes 71 and the supporting flange 41c is interposed between the connection flange 71a and the connection flange 1b of the adjacent flow pipeline 1.

The connecting joint member 72 refers to an element that is installed inside the curved flow pipe 71 and connected to the driving shafts 2 arranged forward and backward, and includes a first universal joint 72a connected to the driving shaft connecting member 42 of the spinning supporter 4 placed forward, a second universal joint 72b connected to the driving shaft connecting member 42 placed backward, and a joint shaft 72c connected between the first and second universal joints 72a and 72b. Here, detailed illustration and descriptions about the first and second universal joints 72a and 72b will be omitted because they include a pair of yokes arranged to cross each other, a spider coupled with a needle bearing, etc., and employ a well-known machinery element externally formed with a boot that functions as a cover.

Referring to FIG. 5, the operations of the hydropower generator according to the second alternative example will be briefly described. Although a flow path of a fluid such as a river and a waterway is curved along a landform and the like, the curved flow pipe 71 is installed corresponding to a radius of a curved portion and the connecting joint member 72 is internally installed and connected so that the front driving shaft 2 and the back driving shaft 2 can operate as a single body to transfer the spinning force to the power generator 5, thereby effectively achieving a hydropower generation system regardless of the landform and the like outside conditions.

Figure 6:
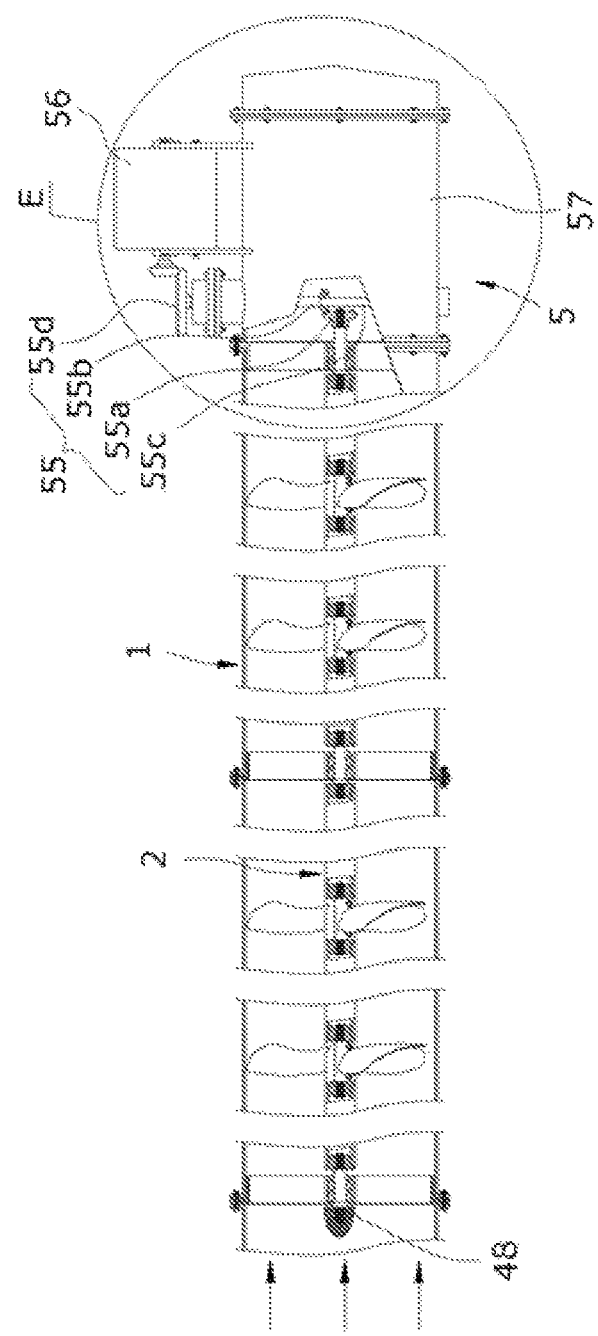
FIG. 6 is a view for describing a third alternative example of the hydropower generator according to the first embodiment of the disclosure.
Figure 7A:
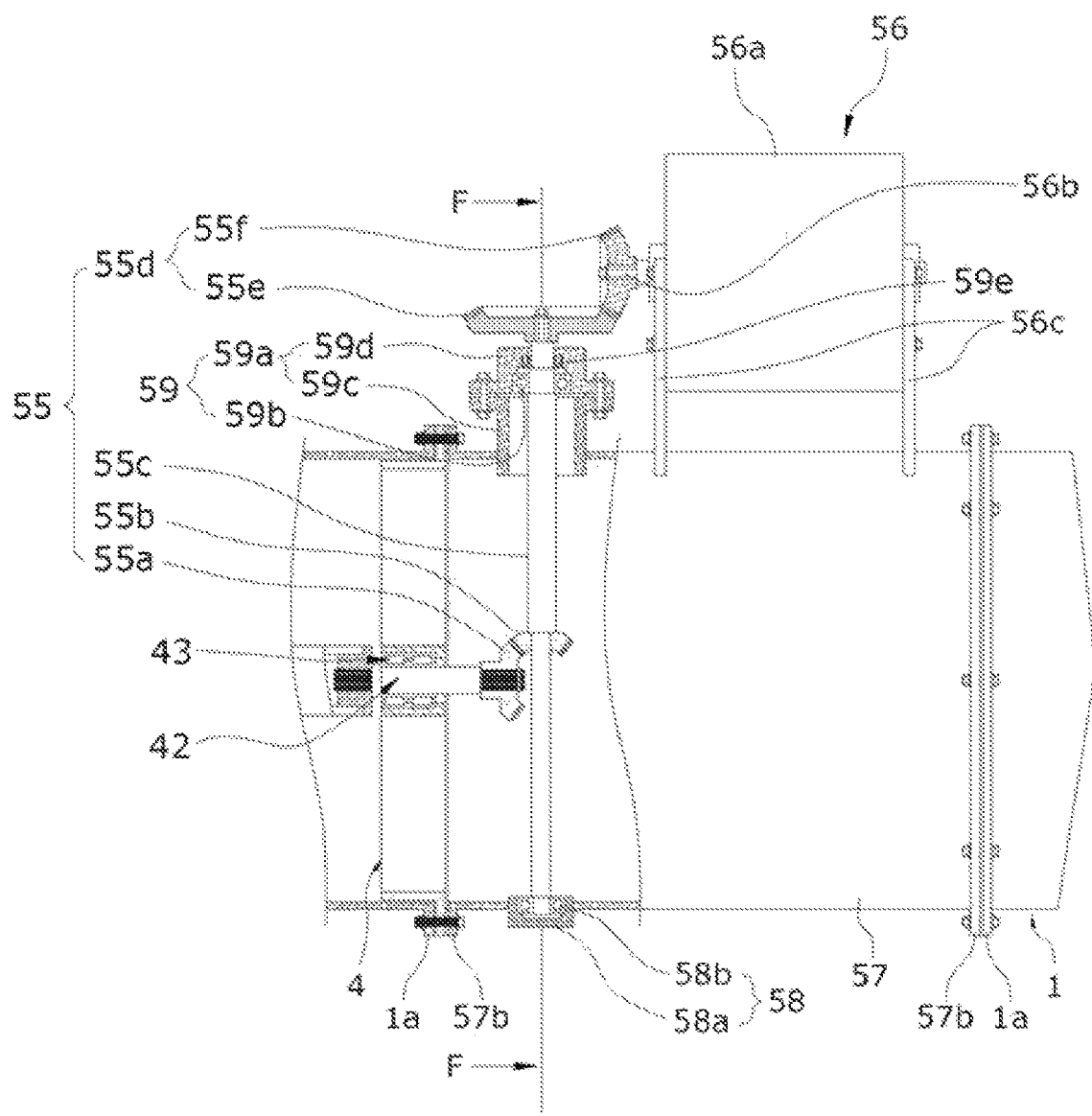
FIG. 7a is an enlarged view of "E" in FIG. 6.

FIG. 6 is a view for describing a third alternative example of the hydropower generator according to the first embodiment of the disclosure, in which some parts of the hydropower generator are omitted along the lengthwise direction because the hydropower generator is very long, a part is cut open to show an internal structure, and major parts are illustrated to show their cross-section structures. FIG. 7a is an enlarged view of "E" in FIG. 6, in which major parts are partially illustrated as cross-sections, and FIG. 7b is a cross-sectional view taken along line F-F in FIG. 7a.

Figure 7B:
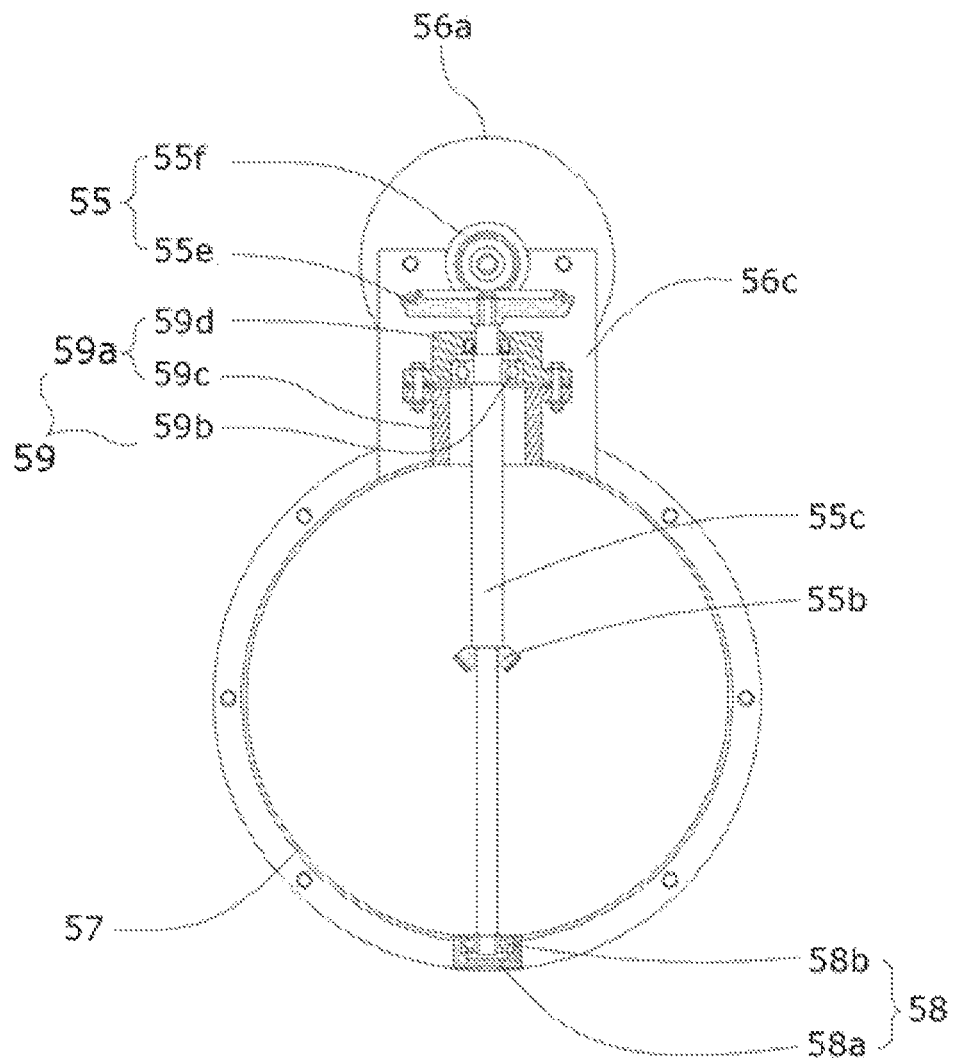
FIG. 7b is a cross-sectional view taken along line F-F in FIG. 7a, FIG. 8a is a perspective view partially showing a hydropower generator according to a second embodiment of the disclosure.

Referring to FIG. 6 to FIG. 7b, the hydropower generator according to the third alternative example of the first embodiment of the disclosure includes the flow pipeline 1, the driving shaft 2, the blade assembly 3, the spinning supporter 4, and the power generator 5, and the power generator 5 includes a power transmission device 55 and a generator 56, in which the power transmission device 55 employs a gear-based power transmission method using gears meshing with each other.

The power transmission device 55 refers to an element that is provided between the driving shaft 2 and the generator 56 to transmit the spinning force generated when the multistage blade assemblies 3 spin, and includes a driving gear 55*a*, a power-transmission gear 55*b*, a power transmission shaft 55*c*, and an overdrive gearing unit 55*d* as shown in FIG. 7*a* and FIG. 7*b*.

The driving gear 55*a* refers to a gear provided at an end portion of the driving shaft 2, and the power-transmission gear 55*b* refers to a gear provided in the power transmission shaft 55*c* and meshing with the driving gear 55*a*, in which bevel gears are employed so that an input bevel gear portion and an output bevel gear portion can mesh with each other to form a gear unit.

The power transmission shaft 55*c* is formed as a rod-shaped member installed perpendicularly to a flow direction of a fluid and having a plurality of stepped portions different in outer diameter from one another so as to correspond to a shape of a connected part, and couples and meshes with the power-transmission gear 55*b* at a position corresponding to the driving gear 55*a* and connects with the overdrive gearing unit 55*d* at an upper end exposed to the outside.

Further, the power transmission shaft 55*c* may be directly installed in the flow pipeline 1, but is rotatably installed in a power-generation pipe-line block 57 separately provided in this embodiment.

The overdrive gearing unit 55*d* refers to an element that is connected to the power transmission shaft 55*c* and transmits the spinning force to a rotary shaft 56*b* of the generator 56, and may employ various overdrive systems as long as they are excellent in stable operation and overdrive efficiency. In this embodiment, the overdrive gearing unit 55*d* includes a first overdrive gear 55*e* connected to the power transmission shaft 55*c*, and a second overdrive gear 55*f* meshing with the first overdrive gear 55*e* and connected to the rotary shaft of the generator 56.

The first overdrive gear 55*e* and the second overdrive gear 55*f* are provided as the foregoing bevel gears and mesh with each other, in which the first overdrive gear 55*e* is the input bevel gear portion having a large diameter and the second overdrive gear 55*f* is the output bevel gear portion having a relatively small diameter for the purpose of overdrive.

The generator 56 refers to an element that is connected to the power transmission device 55 and generates electric energy while spinning by a received force, and selectively employs a generator suitable for generation capacity calculated considering the structure or number of blade assemblies 3 installed to the driving shaft 2, a flow amount of fluid flowing in the flow pipeline 1, a flow rate, etc.

Further, the generator 56 includes a generator fastening member 56*c* for fastening a generator body 56*a* to the power-generation pipe-line block 57 to be described later.

Meanwhile, in the hydropower generator according to the disclosure, the power-generation pipe-line block 57, in which the power transmission device 55 and the generator 56 are installed, is connected to the flow pipeline 1.

The power-generation pipe-line block 57 may be installed in the head or middle of the plurality of arranged and assembled flow pipelines 1, but may as shown in FIG. 6 be connected to the flow pipeline 1 positioned at the tail end of a flow pipeline assembly into which the plurality of flow pipelines 1 are assembled.

Further, power-generation pipe-line block 57 is formed to have a structure where the connection flanges 57*b* are coupled to both ends of a body having a shape corresponding to the flow pipeline 1, and has a structure of a circular pipe having the same inner diameter as that of the flow pipeline 1 provided as the circular pipe in this embodiment.

Further, the spinning supporter 4 is installed in the form of being interposed between the front of the power-generation pipe-line block 57 and the connection flange 1*b* of the adjacent flow pipeline 1. The spinning supporter 4 functions to support a gearing state to be firmly maintained between the driving gear 55*a* and the power-transmission gear 55*b* coupled to the power transmission shaft 55*c* while supporting the end of the driving shaft 2 disposed therein.

In addition, the power-generation pipe-line block 57 is installed with a lower transmission-shaft supporter 58 to which the power transmission shaft 55*c* is rotatably supported at a lower side, and an upper transmission-shaft supporter 59 at an upper side.

The lower transmission-shaft supporter 58 includes a cap-shaped lower-shaft holding member 58*a* coupled to the lower outer surface of the power-generation pipe-line block 57, and a transmission-shaft lower bearing 58*b* inserted in the lower-shaft holding member 58*a* and coupled to the lower end of the power transmission shaft 55*c*.

The upper transmission-shaft supporter 59 includes an upper-shaft holding member 59*a* coupled to the upper outer surface of the power-generation pipe-line block 57, and a transmission-shaft upper bearing 59*b* inserted in the upper-shaft holding member 59*a* and coupled to the upper end of the power transmission shaft 55*c*. Further, the upper-shaft holding member 59*a* includes an upper-shaft holding body 59*c* coupled to the power-generation pipe-line block 57 and shaped like a nozzle, and an upper-shaft holding cap 59*d* coupled to an upper portion of the upper-shaft holding body 59*c* and internally provided with the transmission-shaft upper bearing 59*b*. In this case, the upper-shaft holding body 59*c* and the upper-shaft holding cap 59*d* are formed with flanges for connection and fastened by a bolt. Further, a seal or the like airtight member 59*e* for preventing leakage is interposed between the outer circumferential surface of the power transmission shaft 55*c* and the hole formed in the upper-shaft holding cap 59*d*.

The hydropower generator according to the third alternative example of the first embodiment of the disclosure as shown in FIG. 6 to FIG. 7*b* employs the gear-based power transmission method for the power transmission device 55, so that the spinning force of the driving shaft 2 transferred to the driving gear 55*a*, the power-transmission gear 55*b*, the power transmission shaft 55*c*, and the overdrive gearing unit 55*d* in sequence can be achieved by a meshing action of gear teeth, thereby having an advantage that power transmission is stable because the spinning force is accurately transmitted.

Below, other embodiments of the disclosure will be described, in which descriptions will be focused on elements different from the elements shown in the alternative examples of the foregoing first embodiment while omitting descriptions of similar elements. Further, a structure may be selectively applied to the following embodiments as long as it is employable among the elements shown in the alternative examples of the first embodiment or elements shown in another embodiment, and detailed descriptions or illustration thereof will be omitted.

Figure 8A:
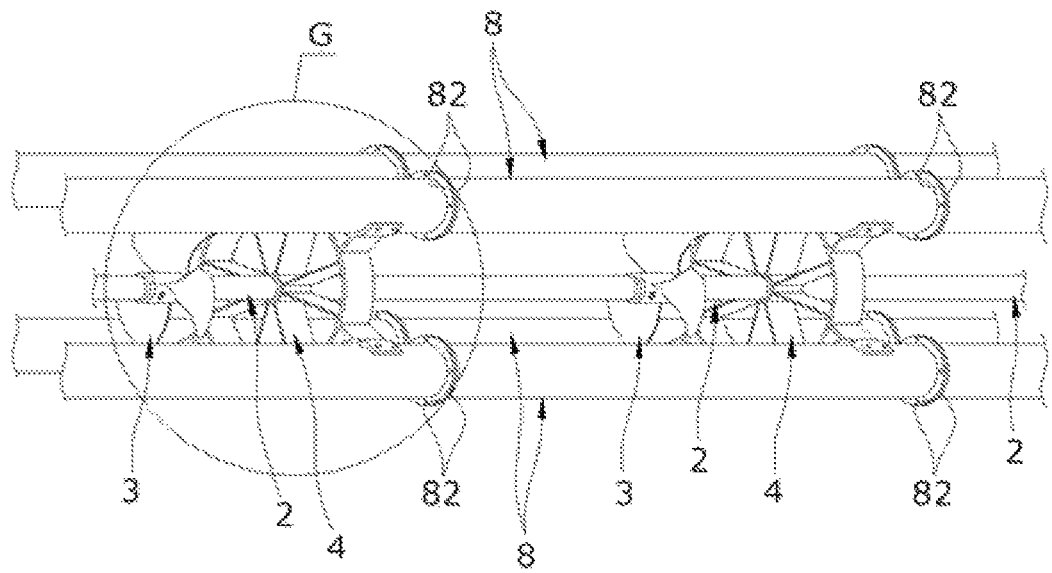
FIG. 8b is an exploded perspective view of "G" in FIG. 8a, FIG. 9a is a view for describing a hydropower generator according to a third embodiment of the disclosure.
Figure 8B:
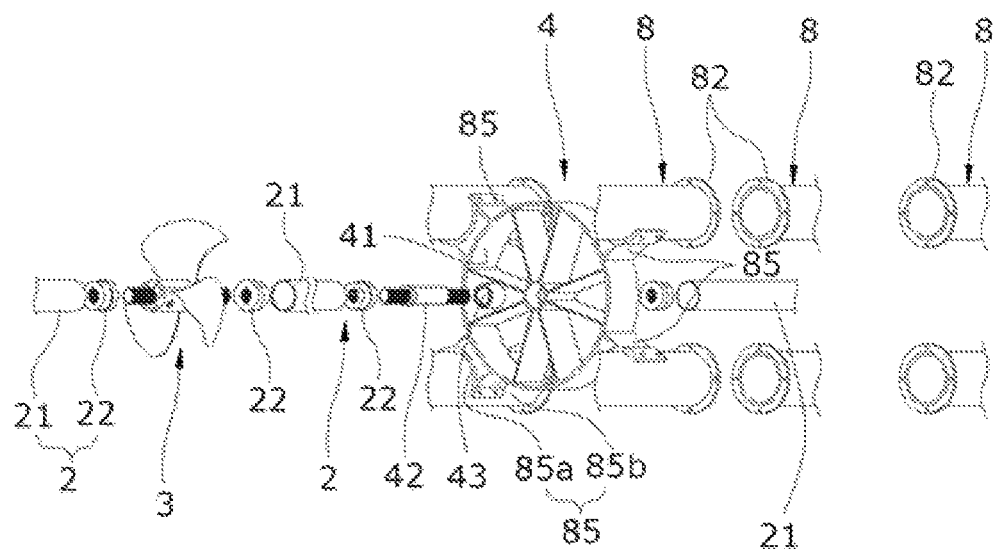

FIG. 8*a* is a perspective view partially showing a hydropower generator according to a second embodiment of the disclosure, and FIG. 8*b* is an exploded perspective view of "G" in FIG. 8*a*.

Referring to FIG. 8*a* and FIG. 8*b*, the hydropower generator according to the second embodiment of the disclosure includes major elements such as the driving shaft 2, the blade assembly 3, the spinning supporter 4, and the power generator 5 like those of the foregoing first embodiment, in which the flow pipeline is received from the elements of the first embodiment, and structural supporters 8 are included for supporting the spinning supporter 4 including the driving shaft 2 and the blade assembly 3.

The driving shaft 2 refers to a shaft member installed along a path through which a fluid flows, the blade assembly 3 refers to an element installed along the lengthwise direction of the driving shaft 2 and spinning by the load of the fluid, and the power generator (not shown) refers to an element receiving the spinning force of the driving shaft 2 and generating electricity, which are the same or similar to those described in the foregoing first embodiment and therefore detailed descriptions thereof will be omitted. The following descriptions will be made focusing on different elements.

The spinning supporter 4 refers to an element rotatably supporting the driving shaft 2, and includes the shaft supporting member 41, the driving shaft connecting member 42, and the driving shaft bearing 43 like those of the first embodiment. The shaft supporting member 41 couples with a pipe coupling member 85 for holding the structural supporter 8.

The pipe coupling member 85 may be variously configured according to the shape, number, etc. of structural supporters 8. In this embodiment, there are four pipe coupling members 85 equiangularly arranged on the outer surfaces of the shaft supporting members 41, and each pipe coupling member 85 includes a pipe contact portion 85a shaped like an arc and being in close contact with the structural supporter 8, and two pipe supporting portions 85b formed in the pipe contact portion 85a.

The structural supporters 8 refer to elements arranged along the lengthwise direction of the driving shaft 2 and coupled to the spinning supporter 4, and are formed to have support structural pipes shaped like pipes, coupled to the pipe coupling member 85, and connected to each other by their pipe flanges 82.

As described above, the hydropower generator according to the second embodiment of the disclosure has a structure that the driving shaft 2, the blade assembly 3, etc. are supported by the structural supporter 8, and therefore the driving shaft 2 and the blade assembly 3 are not sealed by the flow pipeline 1 but exposed to the outside unlike the foregoing first embodiment, thereby having advantages that it is easy to check the operation states of the driving shaft 2 and the blade assembly 3 and it is convenient to perform maintenance.

Further, the hydropower generator according to the second embodiment of the disclosure is preferably installed and used in a river, a channel, and the like where floating materials are not present, because the driving shaft 2, the blade assembly 3, etc. are exposed to the outside and adversely affected by the floating materials.

Figure 9A:
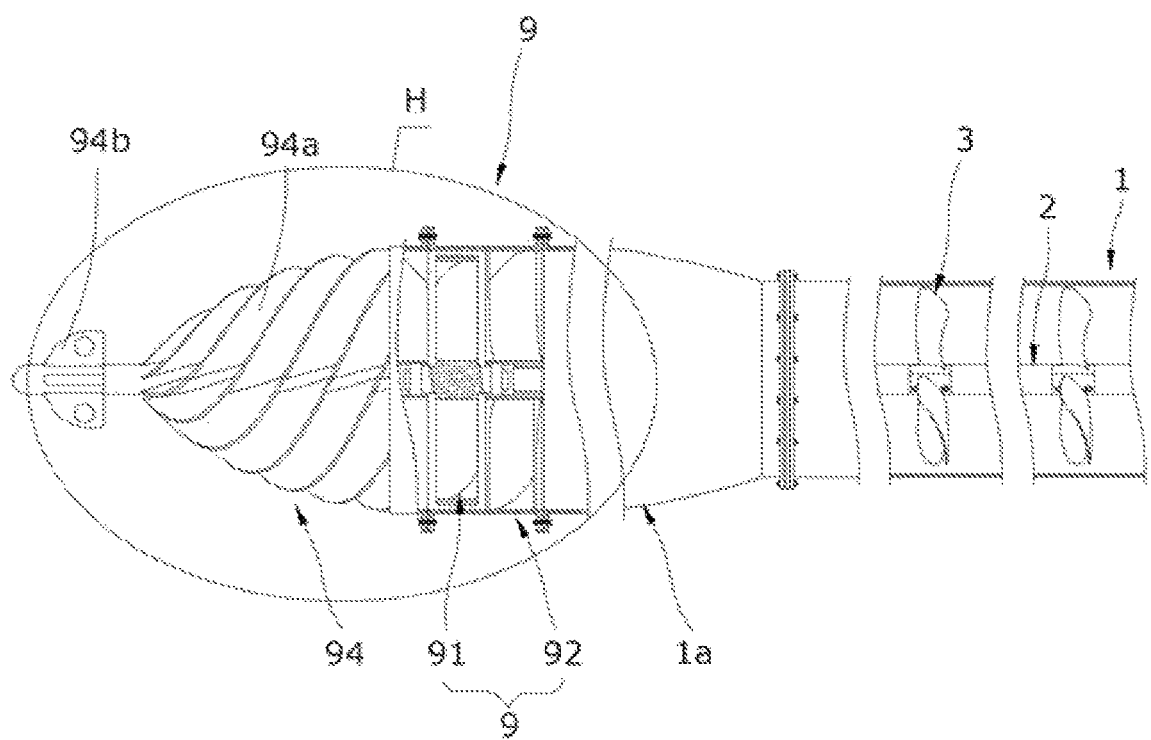
FIG. 9b is an exploded perspective view of "H" in FIG. 9a, FIG. 10a is a perspective view showing an outer appearance structure of a first alternative example of the hydropower generator according to the third embodiment of the disclosure.
Figure 9B:
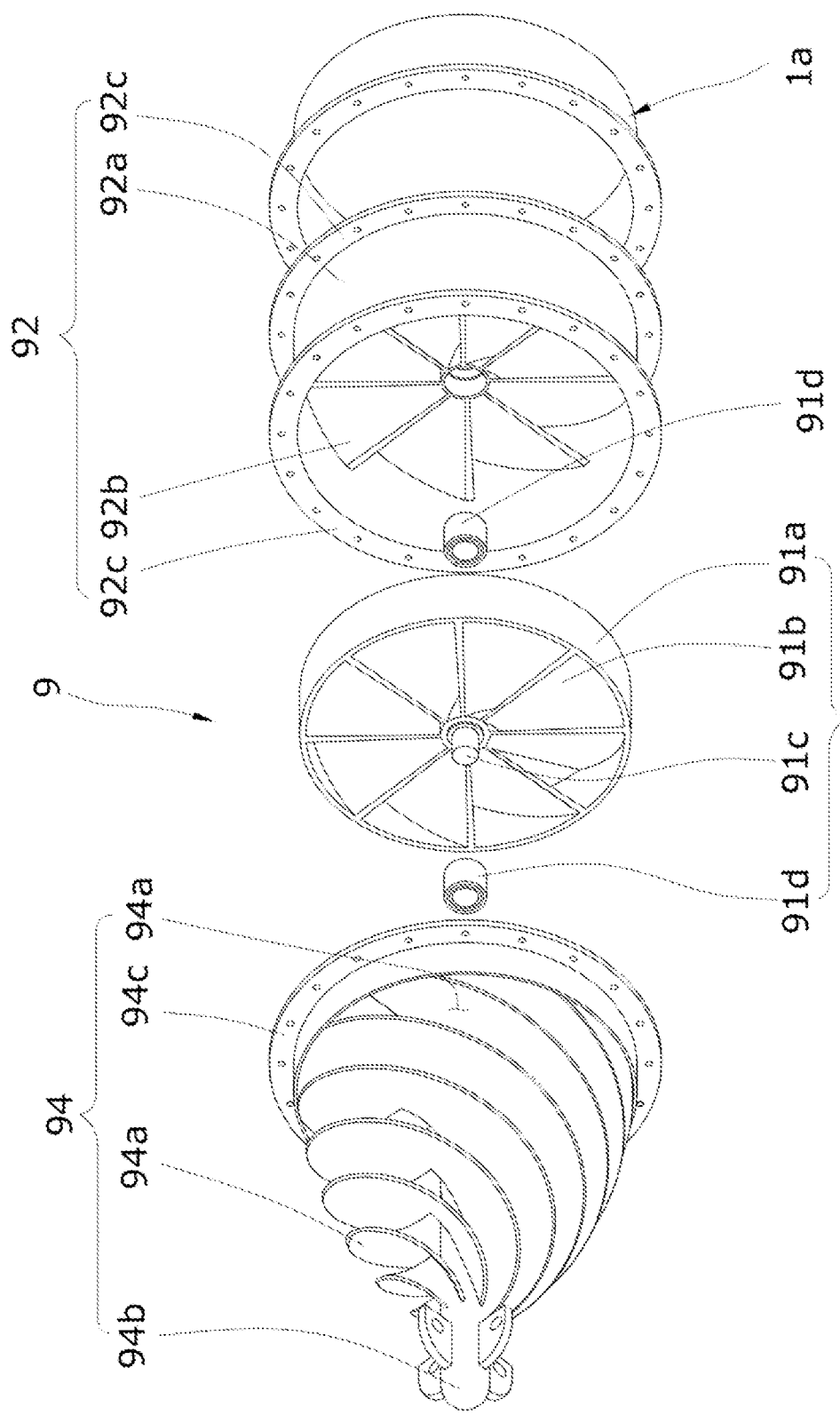

FIG. 9a is a view for describing a hydropower generator according to a third embodiment of the disclosure, in which some parts of the hydropower generator are omitted along the lengthwise direction because the hydropower generator is very long, and a part is cut open along the lengthwise direction of the flow pipeline to show an internal structure. FIG. 9b is an exploded perspective view of "H" in FIG. 9a.

Referring to FIG. 9a and FIG. 9b, the hydropower generator according to the third embodiment of the disclosure includes major elements such as the driving shaft 2, the blade assembly 3, the spinning supporter 4, and the power generator 5 like those of the foregoing first embodiment, in which a shredder 9 is provided to shredding foreign materials introduced into the flow pipeline 1 as included in the fluid.

The shredder 9 may be variously configured without any special limits as long as it can cut and tear the foreign materials involved and introduced in the fluids into small pieces. As shown in FIG. 9a and FIG. 9b, the shredder 9 includes a rotatable cutter assembly 91 rotatably installed inside a channel, and a stationary cutter assembly 92 disposed opposite to the rotatable cutter assembly 91.

The rotatable cutter assembly 91 includes a plurality of rotary cutters 91b equiangularly formed inside a rotary cutter body 91a shaped like a ring as shown in FIG. 9b, and is rotatably installed by a bearing 91d inserted in a central axis 91c.

The stationary cutter assembly 92 is installed corresponding to the rotatable cutter assembly 91 and interacts with the rotatable cutter assembly 91 to perform a cutting operation when the rotatable cutter assembly 91 spins. The stationary cutter assembly 92 includes a stationary cutter body 92a formed with flanges 92c at opposite sides of a cylindrical body thereof, and a plurality of stationary cutters 92b installed inside the stationary cutter body 92a and corresponding to the rotary cutters 91b.

Meanwhile, the hydropower generator according to the third embodiment of the disclosure includes a foreign-material blocking member 94 installed at an entrance of the flow pipeline 1 to prevent foreign materials from flowing therein, as shown in FIG. 9.

The foreign-material blocking member 94 may be variously shaped without any special limits as long as it can guide incoming foreign materials outward and prevent the foreign materials from being introduced in to the flow pipeline 1. For example, the foreign-material blocking member 94 includes a foreign-material removing screw 94a formed by turning a band member spirally, a mooring fastener 94b formed at a front end of the foreign-material removing screw 94a and formed with a towing hole to which a rope or the like is connected, and a screw flange 94c formed at a rear end of the foreign-material removing screw 94a.

Further, as shown in FIG. 9a, the hydropower generator according to the third embodiment of the disclosure is separately provided with a streamlined front-end pipeline 1a to which the shredder 9 and the foreign-material blocking member 94 are installed and which is connected to the connection flange 1b of the frontmost flow pipeline 1.

When a fluid with foreign materials flows therein, the foreign-material blocking member 94 of the hydropower generator according to the third embodiment of the disclosure guides the foreign materials out of the flow pipeline 1, thereby primarily preventing the foreign materials from flowing into the flow pipeline. Nevertheless, when the foreign materials flow in, the rotatable cutter assembly 91 spins by the flow rate and shreds the foreign materials by interaction with the stationary cutter assembly 92, thereby preventing a problem caused by the foreign materials wound around the driving shaft 2 or the blade assembly 3.

Meanwhile, the foreign-material blocking member 94 of the hydropower generator according to the third embodiment of the disclosure may include a cutter device (not shown) for cutting the foreign materials, which have a large area like a vinyl or fabric waste, in order to prevent the foreign materials from entirely covering the entrance of the flow pipeline and stopping the inflow of the fluids.

The cutter device may be achieved by installing a knife-edge on the outer circumferential surface of the streamlined front-end pipeline 1a, and thus the cutter device can easily cut the foreign materials such as vinyl, fabric and the like waste having a large area when the foreign materials enter the entrance of the flow pipeline, thereby preventing malfunction due to the foreign materials having a large area.

Figure 10A:
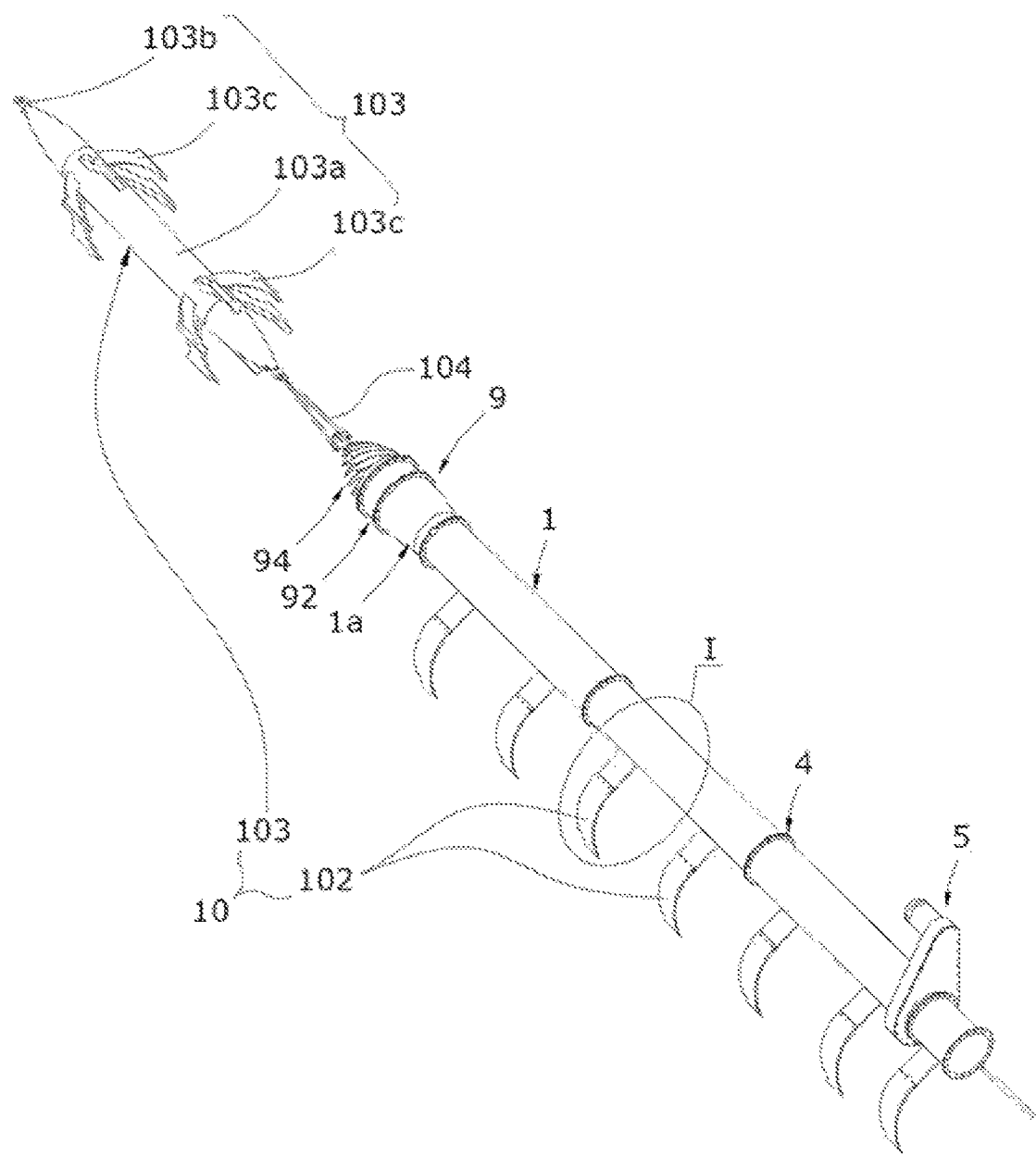
FIG. 10b is an enlarged perspective view of "I" in FIG. 10a, FIG. 11a is a view for describing a second alternative example of the hydropower generator according to the third embodiment of the disclosure.
Figure 10B:
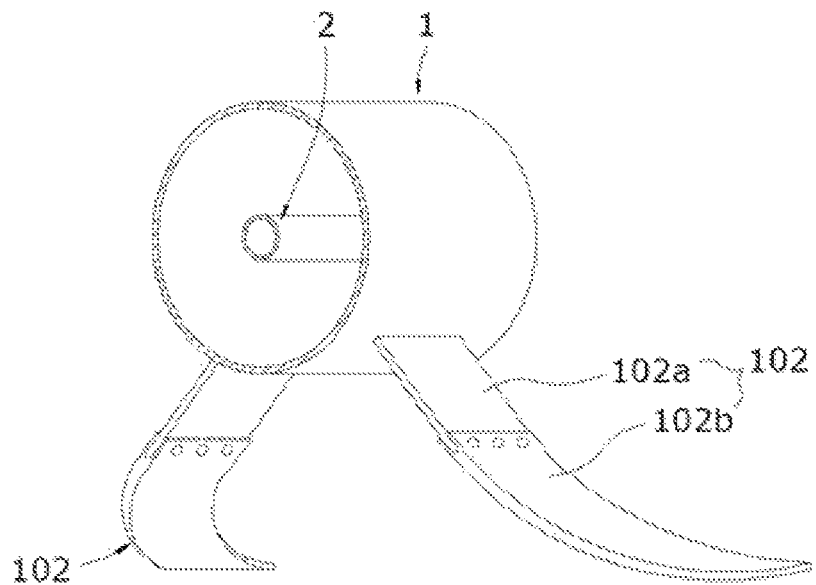

FIG. 10a is a perspective view showing an outer appearance structure of a first alternative example of the hydropower generator according to the third embodiment of the disclosure, and FIG. 10b is an enlarged perspective view of "I" in FIG. 10a, Referring to FIG. 10a and FIG. 10b, the hydropower generator according to the first alternative example of the third embodiment of the disclosure includes the driving shaft 2, the blade assembly 3, the spinning supporter 4, the power generator 5, and the shredder 9 with the foreign-material blocking member 94, and further includes an anchor 10 installed to make the flow pipeline 1 be in position underwater.

The anchor 10 may be variously configured and applied without any special limits as long as it can make the hydropower generator be effectively anchored under water. In this embodiment, the anchor 10 includes a plurality of pipeline fastening hooks 102 formed in the flow pipeline 1, and an anchor body 103 connected to the front of the flow pipeline 1 by a towing rope 104.

The pipeline fastening hook 102 includes a hook bracket 102a, and a hook 102b installed in the hook bracket 102a, as shown in FIG. 10b.

The anchor body 103 includes an anchoring body 103a formed with an internal spacing portion in which a material of high specific gravity is inserted, mooring fasteners 103b formed at the front and rear ends of the anchor body 103 and having towing holes, and a plurality of hooks 103c protruding from the outer surface of the anchoring body 103a. Further, a towing rope (not shown) is connected to the towing hole of the mooring fastener 103b, and it is thus convenient to perform an operation of releasing the fastened state of the anchor body 103 by applying a pulling force to release the mooring state.

Referring to FIG. 10a and FIG. 10b, the hydropower generator according to the first alternative example of the third embodiment of the disclosure is stably anchored under water when the pipeline fastening hook 102 is anchored on the bottom under water, a material having a higher specific gravity than water is inserted in the anchor body 103, and the flow pipeline 1 is connected and then anchored on the bottom under water by the towing rope 104, thereby stably performing power generation based on the flow of the fluid such as a sea current, a tidal current, etc.

Figure 11A:
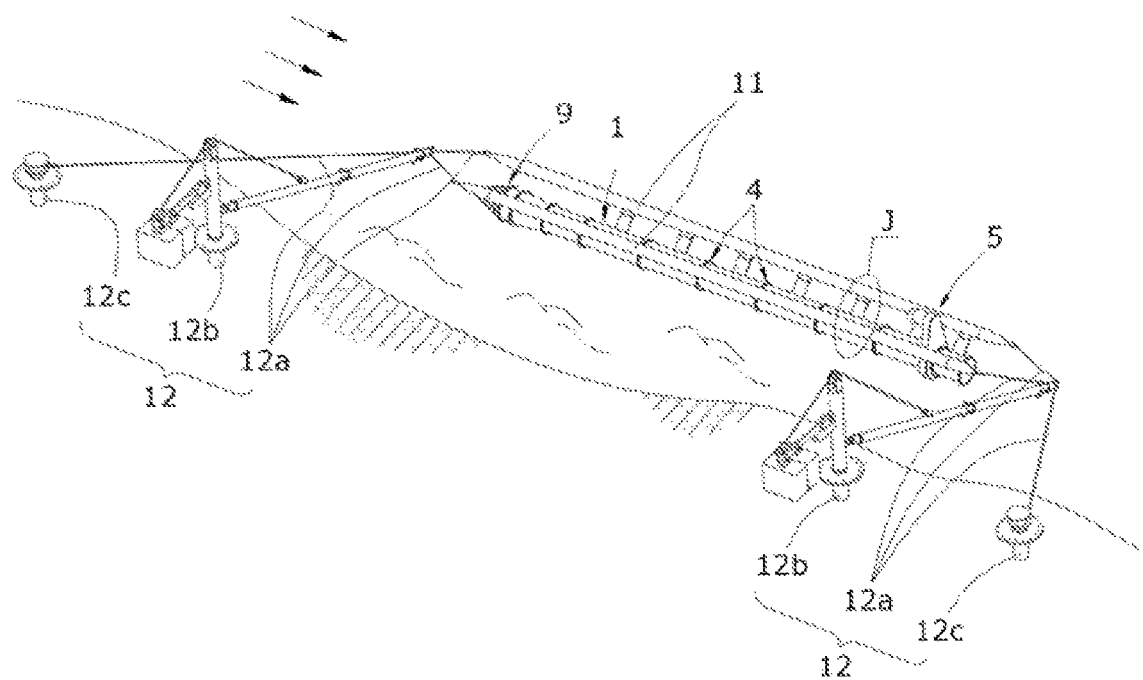
FIG. 11b is an enlarged perspective view of "J" in FIG. 11a, FIG. 12 is a perspective view for describing a third alternative example of the hydropower generator according to the third embodiment of the disclosure.
Figure 11B:
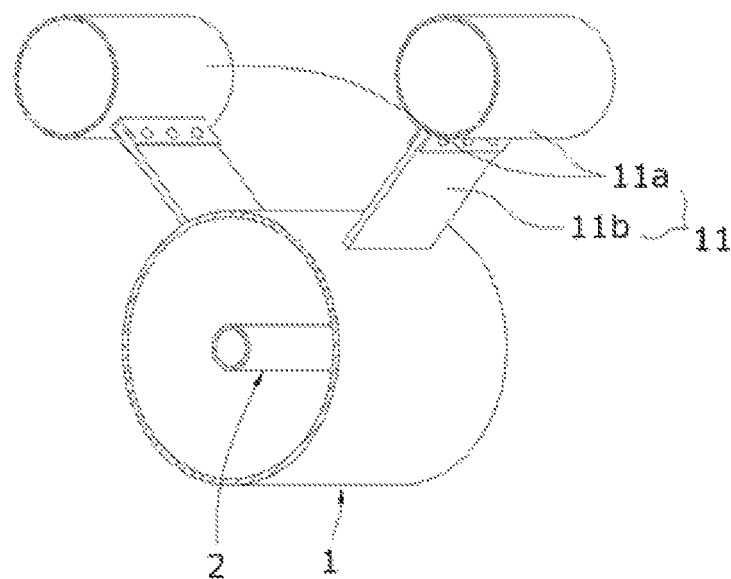

FIG. 11a is a view for describing a second alternative example of the hydropower generator according to the third embodiment of the disclosure, which shows a perspective view of the installed state of the hydropower generator, and FIG. 11b is an enlarged perspective view of "J" in FIG. 11a Referring to FIG. 11a and FIG. 11b, the hydropower generator according to the second alternative example of the third embodiment of the disclosure includes the driving shaft 2, the blade assembly 3, the spinning supporter 4, the power generator 5, and the shredder 9 with the foreign-material blocking member 94, and further includes a buoyant body 11 that gives buoyancy to the flow pipeline 1 so as to generate electric power while floating on or sink under water.

The buoyant body 11 may be variously configured without being limited to any special structure or shape as long as it can make the hydropower generator float on or under water. In this embodiment, the buoyant body 11 includes a buoyant-body fastening bracket 11b installed in the flow pipeline 1, and a floating unit 11a connected to the buoyant-body fastening bracket 11b as shown in FIG. 11b.

Here, the floating unit 11a is formed as a pillar-shaped hollow body having a length corresponding to the whole length of the plurality of flow pipelines 1 connected one another in a row, and a pair of floating units 11a are coupled to the buoyant-body fastening brackets 11b and thus fastened to the flow pipeline 1 as arranged in parallel with each other. In this case, the floating unit 11a is manufactured to be buoyant enough to make the flow pipeline 1 be positioned under water and expose the floating unit 11a to the surface of the water.

Meanwhile, the hydropower generator according to the second alternative example of the third embodiment of the disclosure includes a moorer 12 so that power can be generated floating on a river or the sea.

For example, as show in FIG. 11a, the moorer 12 includes a rope 12a or the like tying member tied to the flow pipeline 1, a towing device 12b for applying a pulling force to the rope 12a, a bollard 12c, etc. Here, the towing device 12b may include a pulling lift including a balance weight, a boom pole, a pillar, etc. as shown in FIG. 11a.

Further, the moorer 12 may be configured without being limited to a special structure or shape as long as it can stably tie up the hydropower generator. Besides the towing device 12b, the moorer 12 may be variously achieved using a winch, a fair leader, etc.

Figure 12:
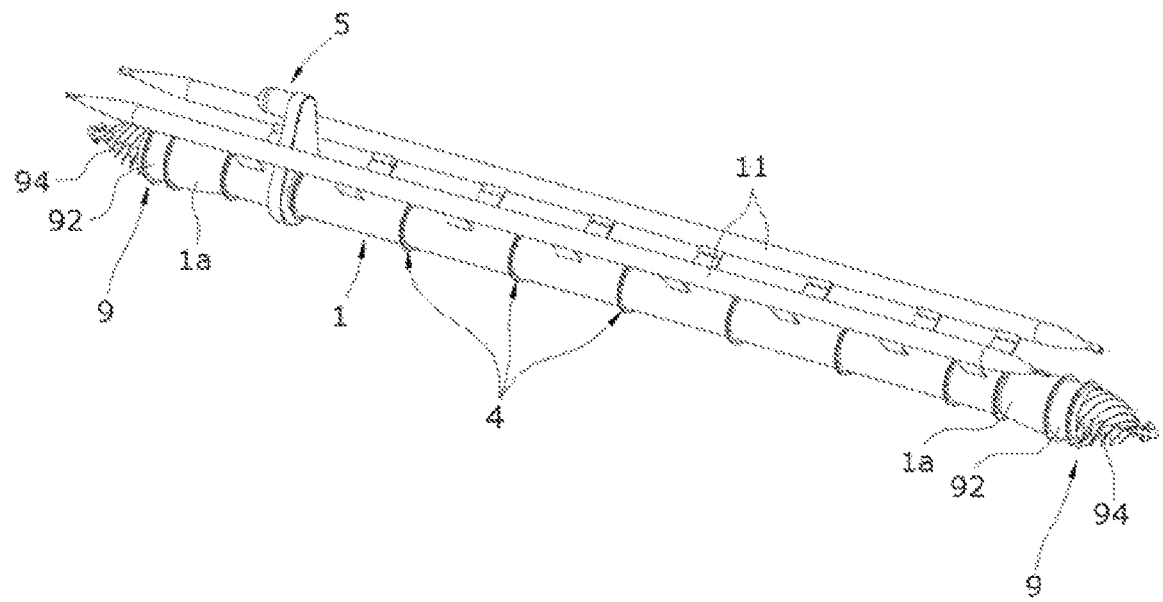

FIG. 12 is a perspective view for describing a third alternative example of the hydropower generator according to the third embodiment of the disclosure.

Referring to FIG. 12, the hydropower generator according to a third example of the third embodiment of the disclosure includes the driving shaft 2, the blade assembly 3, the spinning supporter 4, the power generator 5, the shredder 9 with the foreign-material blocking member 94, and the buoyant body 11, and is characterized in more effectively generating electrical energy in an environment like a tidal current place where flow of a fluid is altered with a time gap therebetween.

To this end, as shown in FIG. 12, the shredder 9 including the foreign-material blocking member 94 is provided in each of the front of the frontmost flow pipeline and the back of the backmost flow pipeline among the flow pipeline assembly in which the plurality of flow pipelines 1 are arranged and connected.

In the hydropower generator according to a third example of the third embodiment of the disclosure, the shredder 9 including the foreign-material blocking member 94 is provided in each of the frontmost and backmost flow pipelines 1, and it is therefore possible to remove and shred foreign materials included in a fluid even through the fluid flows in any direction, thereby stably generating the electrical energy.

Figure 13A:
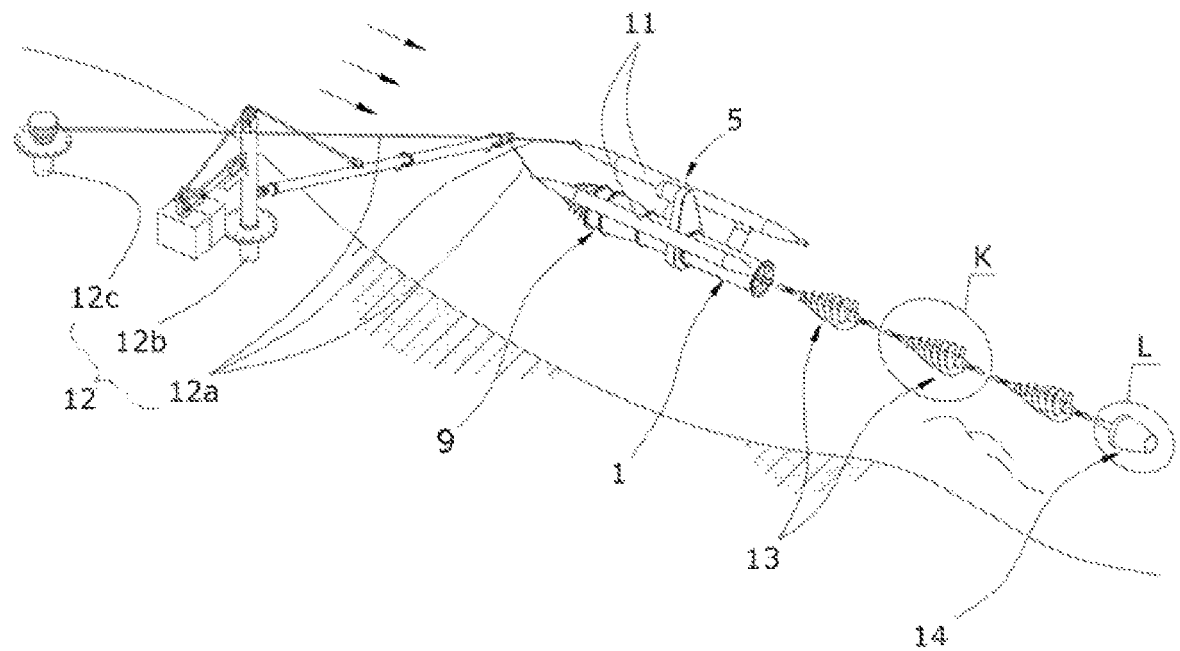
FIG. 13a is a perspective view for describing a fourth alternative example of the hydropower generator according to the third embodiment of the disclosure.
Figure 13B:
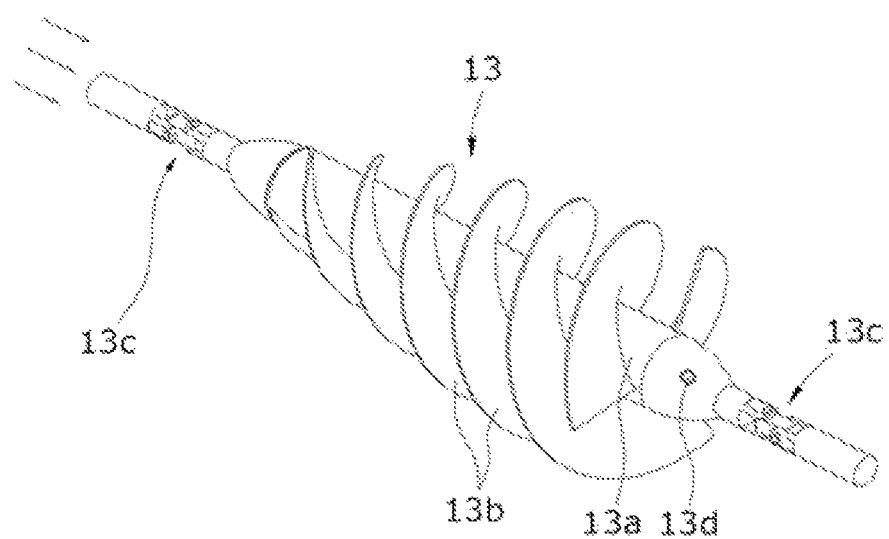
Figure 13C:
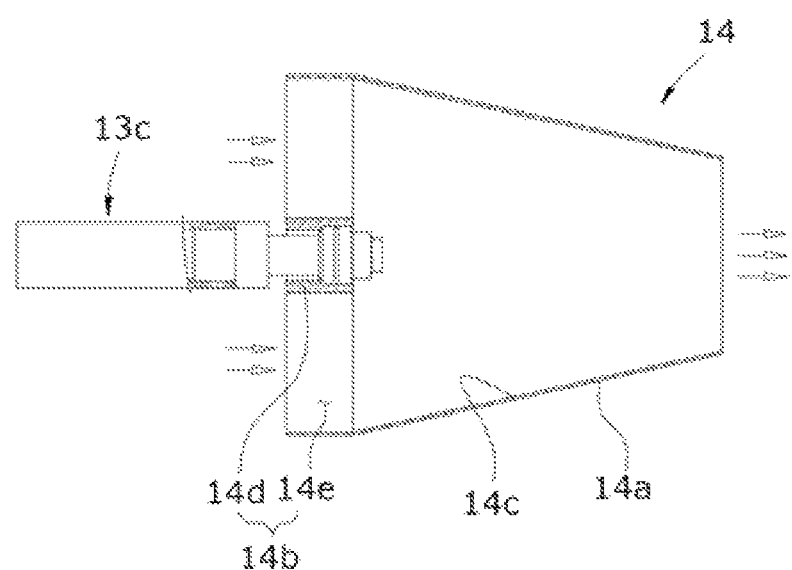

FIG. 13a is a perspective view for describing a fourth alternative example of the hydropower generator according to the third embodiment of the disclosure, FIG. 13b is an enlarged perspective view of "K" in FIG. 13a, and FIG. 13c is a partial cross-section view of "L" in FIG. 13a, in which a part is cut open and major parts are illustrated to show their cross-section structures.

Referring to FIG. 13a, the hydropower generator according to the fourth example of the third embodiment of the disclosure includes the driving shaft 2, the blade assembly 3, the spinning supporter 4, the power generator 5, the shredder 9 with the foreign-material blocking member 94, the buoyant body 11, and the moorer 12, and further includes an auxiliary spinning maker 13 applying a stronger spinning force to the driving shaft 2, thereby improving a power generation efficiency.

As shown in FIG. 13b, the auxiliary spinning maker 13 includes a floating body 13a, a blade 13b formed in the floating body 13a, a connecting joint member 13c, etc. and is configured to be connected to the driving shaft 2 or the flow pipeline 1.

The floating body 13a is structured to have an inlet 13d formed in a hollow body. In this case, the inlet 13d is formed to have a structure in which air bleeding is allowable to control buoyancy.

The blade 13b may be achieved by blades of various shapes. In this embodiment, the blade 13b is achieved by a screw blade in which blades are spirally arranged to prevent foreign materials from being wound therearound. In this case, the screw blade may be formed to have a winding diameter increasing backward.

The connecting joint member 13c is configured to allow a connecting portion to have a spinning operation, and thus its direction switching is possible even though a tidal current or high sea is changed in size and direction in the state that the plurality of auxiliary spinning makers 13 are arranged and connected forward and backward, thereby preventing adjacent devices from colliding with each other and therefore performing a stable operation without damage or breakage.

Further, the connecting joint member 13c may be achieved by a universal joint and the like publicly known mechanical element as described above with reference to FIG. 5, and thus detailed descriptions thereof will be omitted.

Meanwhile, the hydropower generator according to the fourth example of the third embodiment of the disclosure includes a tensioner 14 for applying tension so that the plurality of auxiliary spinning makers 13 can be arranged in a straight line.

The tensioner 14 is connected to the connecting joint member 13c coupled to the backmost auxiliary spinning maker 13 as shown in FIG. 13a and FIG. 13c, and includes a tension body 14a, and a support member 14b placed ahead of the tension body 14a and connect with the shaft of the connecting joint member 13c (or the driving shaft) by a bearing 43.

The tension body 14a is shaped like a cone to generate resistance against inflow of a fluid, and is formed with a flow hole 14c of which an inlet has a large diameter but an outlet has a relatively small diameter.

The plurality of support members 14b are radially provided in the large-diameter inlet of the tension body 14a, and includes a coupling hub 14d formed at the center to which the shaft of the connecting joint member 13c is connected, and a plurality of support plates 14e formed on the outer circumferential surface of the coupling hub 14d and coupled to the inner circumferential surface of the tension body 14a.

As shown in FIG. 13c, when a fluid having a flow rate flows into the large-diameter inlet in a direction of the support member 14b and then moves to the small-diameter outlet, the tensioner 14 generates resistance (force for pushing backward) for pushing the tension body 14a backward as the outlet becomes narrower, and such a pushing force pulls the plurality of auxiliary spinning makers 13 connected by the connecting joint member 13c, thereby making the plurality of auxiliary spinning makers 13 be arranged in a straight line. When the flow pipeline 1 and the plurality of auxiliary spinning makers 13 are arranged in a straight line along the same line, the power generation is stably carried out without causing a problem of collision between the plurality of auxiliary spinning makers 13.

The foregoing descriptions are merely one embodiment of carrying out the hydropower generator according to the disclosure, and the disclosure is not limited to the foregoing embodiment, but the technical concept of the disclosure covers up to a range in which various changes can be made by anyone having ordinary knowledge in the art to which the disclosure pertains without departing from the gist of the disclosure defined in the following claims.

The terms used in the foregoing embodiment are only used to describe a specific embodiment, and not intended to limit the disclosure. Singular forms are intended to include plural forms unless otherwise mentioned contextually. In the disclosure, it will be understood that the terms "include", "have", etc. are to include the presence of features, numbers, steps, operations, elements, components or combination thereof, but do not preclude the presence or addition of one or more other features, numbers, steps, operations, elements, components or combination thereof.

INDUSTRIAL APPLICABILITY

A hydropower generator according to the disclosure has a compact and simple structure, efficiently generates electric energy by arranging multistage blade assemblies along a flow path of a fluid, and not only improves power generation efficiency but also is easily installed and dramatically lowers installation costs because the arrangement position and the number of blade assemblies are properly adjustable according to flow amount, flow rate, designed capacity and local conditions, thereby effectively generating power in any place where water flows.

The invention claimed is:

1. A hydropower generator comprising:
a plurality of driving shafts arranged along a path through which a fluid flows;
a plurality of blade assemblies respectively mounted on the plurality of driving shafts along a lengthwise direction of the plurality of driving shafts;
a spinning supporter connected to rotatably support each driving shaft; and
a power generator receiving a spinning force of the plurality of driving shafts and generating electricity,
wherein each driving shaft comprises a pipe, and a coupling ring coupled to the pipe and having a shaft binding hole at an inner center thereof,
wherein each blade assembly comprises at least one blade having a blade bracket in a blade portion, and a blade connecting member connected to the respective driving shaft and coupling with the blade bracket,
wherein the blade connecting member comprises a bracket connector disposed at a center thereof to which the blade bracket is fastened, and a shaft binding protrusion protruding frontward and backward from the bracket connector and connected to the respective driving shaft, and
wherein the blade bracket comprises a bracket coupling protrusion, the bracket connector comprises a bracket coupling groove in which the bracket coupling protrusion is inserted, the shaft binding protrusion comprises an uneven protrusion on an outer circumferential surface thereof, and the coupling ring comprises an uneven groove to be coupled with the uneven protrusion of the shaft binding protrusion on an inner circumferential surface of the shaft binding hole.

2. The hydropower generator according to claim 1, further comprising:

a flow pipeline, the plurality of driving shafts being arranged therein along a lengthwise direction thereof and a channel through which the fluid flows being formed therein.

3. The hydropower generator according to claim 2, wherein the spinning supporter comprises:
a driving shaft bearing disposed in each driving shaft; and
a shaft supporting member coupled to the flow pipeline and connecting with the driving shaft bearing.

4. The hydropower generator according to claim 2, wherein the spinning supporter comprises:
a driving shaft bearing disposed in each driving shaft; and
a shaft supporting member comprising a supporting hub having a center hole in which the driving shaft bearing is disposed, a plurality of supports having first ends connected to a circumference of the supporting hub, and a supporting flange formed in second ends of the plurality of supports and coupled to the flow pipeline, and
wherein the flow pipeline includes a plurality of partial flow pipelines being arranged in a lengthwise direction and connected to each other.

5. The hydropower generator according to claim 4, wherein the spinning supporter further comprises a driving shaft connecting member inserted and installed disposed in the shaft supporting member to connect each driving shafts arranged frontward and backward.

6. The hydropower generator according to claim 5, wherein the driving shaft connecting member comprises a center in which the driving shaft bearing is inserted and opposite sides at which the shaft binding protrusion to be connected to each driving shaft is formed.

7. The hydropower generator according to claim 4, wherein
the flow pipeline comprises two connection flanges by which two partial flow pipelines arranged frontward and backward are connected, and
the supporting flange is interposed and held between the two connection flanges.

8. The hydropower generator according to claim 2, wherein the flow pipeline comprises a monitoring unit to observe an inside thereof and detect an inner state thereof.

9. The hydropower generator according to claim 8, wherein the monitoring unit comprises:
an opening for observation and maintenance, which is formed by perforating a portion of the flow pipeline positioned corresponding to an installation portion for each blade assembly;
an observation window watertightly coupled to the opening for the observation and the maintenance; and
a detector installed in the observation window and detecting an operation state of each blade assembly or a state of a fluid.

10. The hydropower generator according to claim 2, further comprising:
a curved flow pipe disposed in a curved portion of a channel and connected to the flow pipeline; and
a connecting joint member installed inside the curved flow pipe and connecting two driving shafts arranged frontward and backward.

11. The hydropower generator according to claim 10, wherein the spinning supporter comprises:
a driving shaft bearing disposed in each driving shaft; and
a shaft supporting member comprising a supporting hub formed with a center hole in which the driving shaft bearing is inserted, a plurality of supports having first ends connected to a circumference of the supporting hub, and a supporting flange formed in second ends of the plurality of supports and coupled to the flow pipeline,
wherein the curved flow pipe comprises a structure that a connection flange thereof shaped corresponding to a connection flange of the flow pipeline is coupled to opposite ends of a curved body, and
wherein the supporting flange is interposed, coupled and held between the connection flange of the curved flow pipe and the connection flange of the flow pipeline.

12. The hydropower generator according to claim 11, wherein
spinning supporters are disposed in front and back of the curved flow pipe and further comprise a driving shaft connecting member connected to each driving shaft and inserted and installed in the shaft supporting member, and
the connecting joint member comprises a first universal joint connected to the driving shaft connecting member positioned at a front side, a second universal joint connected to the driving shaft connecting member positioned at a back side, and a joint shaft connected between the first universal joint and the second universal joint.

13. The hydropower generator according to claim 2, further comprising:
an auxiliary spinning maker connected to each driving shaft or the flow pipeline, and having a blade in a floating body.

14. The hydropower generator according to claim 13, wherein the floating body comprises a hollow body having an inlet.

15. The hydropower generator according to claim 13, wherein the auxiliary spinning maker includes a plurality of partial auxiliary spinning makers being arranged frontward and backward and connected by a connecting joint member.

16. The hydropower generator according to claim 13, wherein
the auxiliary spinning maker includes a plurality of partial auxiliary spinning makers being arranged frontward and backward and connected to each other by a connecting joint member, and
the hydropower generator further comprises a tensioner connected to a backmost partial auxiliary spinning maker among the plurality of partial auxiliary spinning makers and generating and applying tension.

17. The hydropower generator according to claim 16, wherein the tensioner comprises a tension body having a wide-front and narrow-back structure comprising a flow hole of which an inlet for an inflow of a fluid has a larger diameter and an outlet for an outflow of the fluid has a smaller diameter.

18. The hydropower generator according to claim 2, further comprising:
a shredder disposed in the flow pipeline and shredding foreign materials introduced therein.

19. The hydropower generator according to claim 2, wherein the power generator comprises:
a power generator housing disposed in the flow pipeline;
a power transmission device connected to the plurality of driving shafts and transmitting the spinning force; and
a generator unit disposed in the power generator housing and generating electrical energy while spinning based on a force received as connected to the power transmission device.

20. The hydropower generator according to claim 19, wherein the power transmission device comprises:
a large diameter input pulley disposed inside the power generator housing and receiving the spinning force from the plurality of driving shafts;
a small diameter output pulley disposed in the power generator housing and installed in a rotary shaft of the generator; and
a belt connected to the large diameter input pulley and the small diameter output pulley.

21. The hydropower generator according to claim 20, further comprising a power transmission shaft connected between the large diameter input pulley and the plurality of driving shafts and transmitting the spinning force,
wherein opposite ends of the power transmission shaft are disposed in front and back of the power generator housing and rotatably supported by the spinning supporter and connected to the flow pipeline.

22. The hydropower generator according to claim 2, further comprising a foreign-material blocking member installed in an entrance of the flow pipeline to prevent foreign materials from being introduced therein.

23. The hydropower generator according to claim 22, wherein the foreign-material blocking member comprises a foreign-material removing screw formed by spirally turning a band member, a mooring fastener formed at a front end of the foreign-material removing screw and having a towing hole, and a screw flange formed at a rear end of the foreign-material removing screw.

24. The hydropower generator according to claim 2, further comprising a shredder shredding foreign materials introduced into the flow pipeline,
wherein the flow pipeline includes a plurality of partial flow pipelines being arranged in a lengthwise direction and connected to each other,
wherein the shredder includes a plurality of partial shredders that are installed at a front side of a frontmost partial flow pipeline among the plurality of partial flow pipelines, or respectively installed at the front side of the frontmost partial flow pipeline and installed at a back side of a backmost partial flow pipeline among the plurality of partial flow pipelines.

25. The hydropower generator according to claim 24, wherein the shredder comprises:
a rotatable cutter assembly rotatably installed inside the flow pipeline and comprising a plurality of partial rotary cutters; and
a stationary cutter assembly disposed opposite to the rotary cutter and comprising a plurality of partial stationary cutters.

26. The hydropower generator according to claim 2, further comprising a bypass pipeline device branched and formed from the flow pipeline.

27. The hydropower generator according to claim 26, wherein the bypass pipeline device comprises:
a first T-shaped pipeline connected to a frontmost end of the flow pipeline;
a second T-shaped pipeline connected to a backmost end of the flow pipeline;
a bypass pipeline connected between the first T-shaped pipeline and the second T-shaped pipeline;
a first control valve installed to come into contact with the first T-shaped pipeline to prevent flow toward the flow pipeline;
a second control valve installed to the bypass pipeline; and
a third control valve installed to the backmost end of the flow pipeline.

28. The hydropower generator according to claim 2, further comprising:
a buoyant body coupled to provide buoyancy; and
an anchor installed to be anchored in position under water.

29. The hydropower generator according to claim 28, wherein the anchor comprises an anchor body comprising an anchoring body including an internal spacing portion in which a material of high specific gravity is inserted, mooring fasteners formed at front and rear ends of the anchor body and having towing holes, and a plurality of hooks protruding from an outer surface of the anchoring body.

30. The hydropower generator according to claim 28, wherein the anchor comprises a plurality of pipeline fastening hooks fastened to the flow pipeline.

31. The hydropower generator according to claim 2, further comprising a buoyant body coupled to provide buoyancy,
wherein the buoyant body comprises a buoyant-body fastening bracket installed in the flow pipeline, and a floating unit connected to the buoyant-body fastening bracket.

32. The hydropower generator according to claim 1, further comprising:
a structural supporter disposed along the lengthwise direction of each driving shaft and coupled to the spinning supporter.

33. The hydropower generator according to claim 32, wherein the spinning supporter comprises:
a driving shaft bearing disposed in each driving shaft; and
a supporting hub having a center hole in which the driving shaft bearing is disposed, a plurality of supports having first ends connected to a circumference of the supporting hub, a shaft supporting member formed in second ends of the plurality of supports, and a driving shaft connecting member inserted and disposed in the shaft supporting member to connect two driving shafts arranged frontward and backward, and
wherein the structural supporter comprises a plurality of support structural pipes installed in the shaft supporting member by a pipe coupling member.

34. The hydropower generator according to claim 1, wherein the power generator comprises:
a power transmission device connected to the plurality of driving shafts and transmitting the spinning force; and
a generator unit generating electrical energy while spinning based on a force received as connected to the power transmission device.

35. The hydropower generator according to claim 34, wherein the power transmission device comprises:
a driving gear installed in the plurality of driving shafts;
a power-transmission gear meshing with the driving gear;
a power transmission shaft coupled to the power-transmission gear; and
an overdrive gearing unit connected to the power transmission shaft and transmitting the spinning force to a rotary shaft of the generator.

36. The hydropower generator according to claim 35, wherein
the overdrive gearing unit comprises a first overdrive gear connected to the power transmission shaft, and a second overdrive gear meshing with the first overdrive gear and connected to the rotary shaft of the generator, and
the driving gear and the power-transmission gear comprise bevel gears to mesh with each other, and the first overdrive gear and the second overdrive gear comprise bevel gears to mesh with each other.

37. The hydropower generator according to claim 1, further comprising a buoyant body coupled to provide buoyancy.

38. The hydropower generator according to claim 1, further comprising:
   a buoyant body coupled to provide buoyancy; and
   a moorer comprising a tying member tied to the buoyant body, and a towing device for applying a pulling force to the tying member.

* * * * *